US012697630B2

(12) United States Patent (10) Patent No.: US 12,697,630 B2
Nimrichter et al. (45) Date of Patent: Aug. 4, 2026

(54) TWO-STAGE VALVE FOR HIGH PRESSURE WASHING SYSTEM

(71) Applicant: Stant USA Corp., Connersville, IN (US)

(72) Inventors: Jan Nimrichter, Karvina (CZ); Radek Olbrecht, Vitkov (CZ)

(73) Assignee: Stant USA Corp., Connersville, IN (US)

( * ) Notice: Subject to any disclaimer, the term of this patent is extended or adjusted under 35 U.S.C. 154(b) by 203 days.

(21) Appl. No.: 18/606,339

(22) Filed: Mar. 15, 2024

(65) Prior Publication Data

US 2024/0307895 A1 Sep. 19, 2024

Related U.S. Application Data

(60) Provisional application No. 63/452,251, filed on Mar. 15, 2023.

(51) Int. Cl.
| | |
|---|---|
| *B05B 1/16* | (2006.01) |
| *B60S 1/56* | (2006.01) |
| *F16K 1/36* | (2006.01) |
| *F16K 1/44* | (2006.01) |
| *F16K 1/46* | (2006.01) |
| *F16K 11/044* | (2006.01) |

(52) U.S. Cl.
CPC .............. *B05B 1/1618* (2013.01); *B60S 1/56* (2013.01); *F16K 1/36* (2013.01); *F16K 1/443* (2013.01); *F16K 1/46* (2013.01); *F16K 11/044* (2013.01)

(58) Field of Classification Search
CPC ... F16K 1/36; F16K 1/443; F16K 1/46; F16K 11/044; B05B 1/1609; B05B 1/1618; B60S 1/56
See application file for complete search history.

(56) References Cited

U.S. PATENT DOCUMENTS

| | | | |
|---|---|---|---|
| 3,076,220 A | 2/1963 | Bitzer | |
| 3,128,792 A * | 4/1964 | Clinton ................... | F22D 11/00 |
| | | | 137/625.5 |
| 3,915,385 A | 10/1975 | Hassinger | |
| 5,141,160 A | 8/1992 | Waters | |
| 6,074,078 A | 6/2000 | Georgeff et al. | |
| 6,237,861 B1 | 5/2001 | Northrop et al. | |
| 6,615,438 B1 | 9/2003 | Franco et al. | |
| 6,857,582 B1 | 2/2005 | Wang | |
| 6,896,199 B2 | 5/2005 | Bissonnette | |

(Continued)

FOREIGN PATENT DOCUMENTS

| | | | |
|---|---|---|---|
| DE | 19800013 A1 | 7/1999 | |
| DE | 102018114849 A1 * | 12/2019 | ............ F16K 11/044 |

(Continued)

OTHER PUBLICATIONS

Machine English translation of DE-102018114849-A1 (Year: 2025).*

*Primary Examiner* — Hailey K. Do

(74) *Attorney, Agent, or Firm* — Barnes & Thornburg

(57) ABSTRACT

A high-pressure washing system including a washer fluid tank, a high-pressure fluid pump, and a valve. The washer fluid tank is configured to store a washer fluid. The high-pressure fluid pump is coupled in fluid communication with the washer fluid tank to provide a flow of washer fluid. The valve is coupled in fluid communication with the high-pressure fluid pump to receive the flow of washer fluid.

15 Claims, 17 Drawing Sheets

(56) References Cited

U.S. PATENT DOCUMENTS

| | | | |
|---|---|---|---|
| 6,920,898 B2 * | 7/2005 | Lappan | F16K 39/024 |
| | | | 137/630.14 |
| 9,290,158 B2 | 3/2016 | Dominique et al. | |
| 9,623,846 B2 | 4/2017 | Trager | |
| 10,960,854 B2 | 3/2021 | Richardson | |
| 11,001,233 B2 | 5/2021 | Caillot | |
| 11,034,337 B2 | 6/2021 | Davies et al. | |
| 11,378,200 B2 | 7/2022 | Hernndez et al. | |
| 11,407,384 B2 | 8/2022 | Agrotis et al. | |
| 11,427,163 B2 | 8/2022 | Kubota et al. | |
| 11,541,849 B2 | 1/2023 | Fiebrandt et al. | |
| 11,628,811 B2 | 4/2023 | Hasagic | |
| 11,787,370 B2 | 10/2023 | Fiebrandt et al. | |
| 11,926,290 B2 | 3/2024 | Hernndez et al. | |
| 12,036,956 B2 | 7/2024 | Giraud et al. | |
| 2008/0042090 A1 * | 2/2008 | Zweber | F16K 31/0627 |
| | | | 251/129.15 |
| 2015/0183404 A1 | 7/2015 | Romack et al. | |
| 2020/0114881 A1 | 4/2020 | Yamauchi et al. | |
| 2022/0185240 A1 | 6/2022 | Giraud et al. | |

FOREIGN PATENT DOCUMENTS

| | | | |
|---|---|---|---|
| EP | 1857338 A1 | 11/2007 | |
| WO | 2021170274 A1 | 9/2021 | |

* cited by examiner

VALVE OPERATOR

VALVE (PRIMARY MODE)

BLEED–PASSAGEWAY STOPPER (1ST BLEED–BLOCKING POSITION)

FLUID–FLOW REGULATOR (CLOSED POSITION)

ACTUATOR (DISENGAGED)

$P_1$ $P_2$ $P_0$

See Fig. 6A

VALVE
(FIRST TRANSITION MODE)

BLEED–PASSAGEWAY
STOPPER (SECOND BLEED–
BLOCKING POSITION)

FLUID–FLOW REGULATOR
(INTERMEDIATE POSITION)

VALVE OPERATOR

ACTUATOR
(ENGAGED)

See Fig. 8A

TWO-STAGE VALVE FOR HIGH PRESSURE WASHING SYSTEM

PRIORITY CLAIM

This application claims priority to and the benefit of U.S. Provisional Patent Application No. 63/452,251, filed 15 Mar. 2023, the disclosure of which is now expressly incorporated herein by reference.

BACKGROUND

The present disclosure relates to washing systems adapted for use on a vehicle, and particularly to valves for control the flow of washer fluid to the different nozzles on the vehicle.

SUMMARY

An high-pressure washing system in accordance with the present disclosure is adapted for use on a vehicle to clean windshields. The high-pressure washing system may also be configured to clean any sensors and/or cameras on the vehicle to ensure the proper function of the sensors and/or cameras. For instance, a rear proximity sensor of the vehicle may need to be cleaned so that the sensor has clear line of sight to surroundings.

In the illustrative embodiments, the high-pressure washing system includes a washer fluid tank configured to store a washer fluid tank, washer fluid nozzles in fluid communication with the washer fluid tank, a high-pressure fluid pump, and a valve. The washer fluid nozzles may each be configured to spray washer fluid on different areas of the vehicle, such as the windshields, sensors, and/or cameras on the vehicle. The high-pressure fluid pump may be coupled in fluid communication with the washer fluid tank to provide a flow of washer fluid to each of the nozzles. The valve may be coupled in fluid communication with the high-pressure fluid pump to control the flow of washer fluid to the different nozzles.

In the illustrative embodiments, the valve includes a valve housing, a fluid-flow regulator, and a valve operator. The valve housing defines a tank passageway coupled in fluid communication to the high-pressure fluid pump to receive the flow of washer fluid, a primary washer passageway adapted to be coupled in fluid communication to the primary nozzle, a secondary washer passageway adapted to be coupled in fluid communication to a secondary nozzle. The fluid-flow regulator may be mounted in the valve housing for movement relative thereto along a vertical central axis from a closed position and an opened position.

In the illustrative embodiments, the valve operator is configured to raise the pressure in the second washer passageway as the fluid-flow regulator is moved from the closed position to the opened position, or alternatively, raise the pressure in the primary washer passageway as the fluid-flow regulator is moved from the opened position to the closed position. The valve operator may raise the pressure by bleeding a portion of the flow of washer fluid through a bleed passageway in the fluid-flow regulator. In this way, pressure in the unopened washer passageway begins to rise before the passage is fully opened so as to reduce an amount of force needed move the fluid-flow regulator from the closed position to the opened position, or from the opened position to the closed position, to allow switch the flow of washer fluid to the desired washer passageway.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of a high-pressure washing system in accordance with the present disclosure adapted for use on a vehicle showing the system includes a washer fluid tank configured to store a washer fluid tank, washer fluid nozzles in fluid communication with the washer fluid tank to spray washer fluid on areas of the vehicle, a high-pressure fluid pump coupled in fluid communication with the washer fluid tank to provide a flow of washer fluid to each of the nozzles, and a valve coupled in fluid communication with the high-pressure fluid pump to control the flow of washer fluid to the different nozzles;

FIG. 2 is a perspective view of the valve included in the system of FIG. 1 showing the valve includes a valve housing that defines a tank passageway, a primary washer passageway, and a secondary washer passageway, a fluid-flow regulator mounted in the valve housing for movement relative thereto from a closed position as shown in FIG. 6 and an opened position as shown in FIG. 9, and a valve operator configured to raise the pressure in the second washer passageway as the fluid-flow regulator is moved from the closed position to the opened position, or alternatively, raise the pressure in the primary washer passageway as the fluid-flow regulator is moved from the opened position to the closed position, by bleeding a portion of the flow of washer fluid through a bleed passageway in the fluid-flow regulator as shown in FIG. 7;

FIG. 3 is an exploded perspective assembly view of the valve of FIG. 2 showing the valve includes the valve housing made up of an upper housing body and a lower housing body configured to be selectively coupled to the upper housing body, the fluid-flow regulator having an upper body and a lower body with an outer seal configured to be coupled to the upper body, and the valve operator including a bleed-passageway stopper, a stopper mover arranged to apply a force to urge the bleed-passageway stopper to a first bleed-blocking position as shown in FIG. 6, and an actuator configured to move the bleed-passageway stopper in opposition to the force applied by the stopper mover from the first bleed-blocking position to a bleed-allowing position as shown in FIG. 7 to allow the portion of the flow of washer fluid to flow through the bleed passageway and for moving the bleed-passageway stopper in opposition to the force applied by the stopper mover from the bleed-allowing position to a second bleed-blocking position as shown in FIGS. 8 and 9;

FIG. 3A is an exploded perspective view of the fluid-flow regulator and the valve operator included in the valve of FIG. 3 showing the stopper mover of the valve operator includes a movable armature configured to be operationally coupled to the actuator to move along a vertical stopper-motion axis that is parallel to and aligned with the vertical central axis A and a bias member configured apply the bias force to the movable armature to bias the movable armature toward the lower housing;

FIG. 4 is a cross-sectional view of the valve of FIG. 2 showing the valve housing further defines a medial fluid-transfer passageway in fluid communication with the tank passageway, the primary washer passageway, and the secondary washer passageway that extends along a vertical central axis while the tank passageway, the primary washer passageway, and the secondary washer passageway extends perpendicular to the vertical central axis, and further showing the stopper mover is arranged to move up and down relative to the valve housing along a vertical stopper-motion axis that is coextensive with the vertical central axis.

FIG. 5 is a cross-sectional perspective view of the fluid-flow regulator assembled with the bleed-passageway stopper and the stopper mover included in the valve of FIG. 2 showing the upper body and the lower body of the fluid-flow regulator each extend circumferentially around the bleed-passageway stopper and the stopper mover relative to the vertical stopper-motion axis to define the bleed passageway with the bleed-passageway stopper located in the bleed passageway;

FIG. 5A is a detail view of FIG. 5 showing the stopper mover is formed to include a trapezoidal shaped groove that extends circumferentially around the vertical stopper-motion axis and receives the bleed-passageway stopper, and further showing the upper body and the lower body of the fluid-flow regulator include snap fit feature that couples the lower body with the upper body for movement therewith;

FIG. 6 is a cross-sectional view of the valve of FIG. 4 showing the actuator is not energized so that a bias spring of the stopper mover urges the bleed-passageway stopper to be in the first bleed-blocking position while the fluid-fluid flow regulator is in the closed position to block the flow of washer fluid through an inlet opening of the secondary washer passageway so that the flow of washer fluid from the high-pressure fluid pump only flows through the primary washer passageway to the primary nozzle;

FIG. 6A is a detail view of FIG. 6 showing the bleed-passageway stopper engages a lower stopper seat on the fluid-flow regulator while in the first bleed-blocking position and the fluid-flow regulator engages a first valve seat on the valve housing while in the closed position to block the flow of washer fluid through the inlet opening of the secondary washer passageway so that the flow of washer fluid from the high-pressure fluid pump may flow through an inlet opening of the primary washer passageway;

FIG. 7 is a cross-sectional view similar to FIG. 6 showing upward movement of the stopper mover in response to receiving the electrical signal from the actuator to cause the bleed-passageway stopper to move from the first bleed-blocking position to the bleed-allowing position to bleed the portion of the flow of washer fluid to flow through the bleed passageway to the secondary washer passageway to begin to increase pressure in the secondary washer passageway relative to pressure in the primary washer passageway before the inlet opening of the secondary washer passageway is fully opened as shown in FIG. 8;

FIG. 7A is a detail view of FIG. 7 showing the bleed-passageway stopper is disengaged from the fluid-flow regulator while in the bleed-allowing position to open the bleed passageway and the fluid-flow regulator remains in the closed position;

FIG. 8 is a cross-sectional view similar to FIG. 7 showing further upward movement of the stopper mover in response to receiving the electrical signal from the actuator to cause the bleed-passageway stopper to move from the bleed-allowing position to the second bleed-blocking position as the fluid-fluid flow regulator moves to an intermediate position to block the flow of washer fluid through the bleed passageway so that the flow of washer fluid from the high-pressure fluid pump flows to both the primary and secondary washer passageways;

Figure 8:
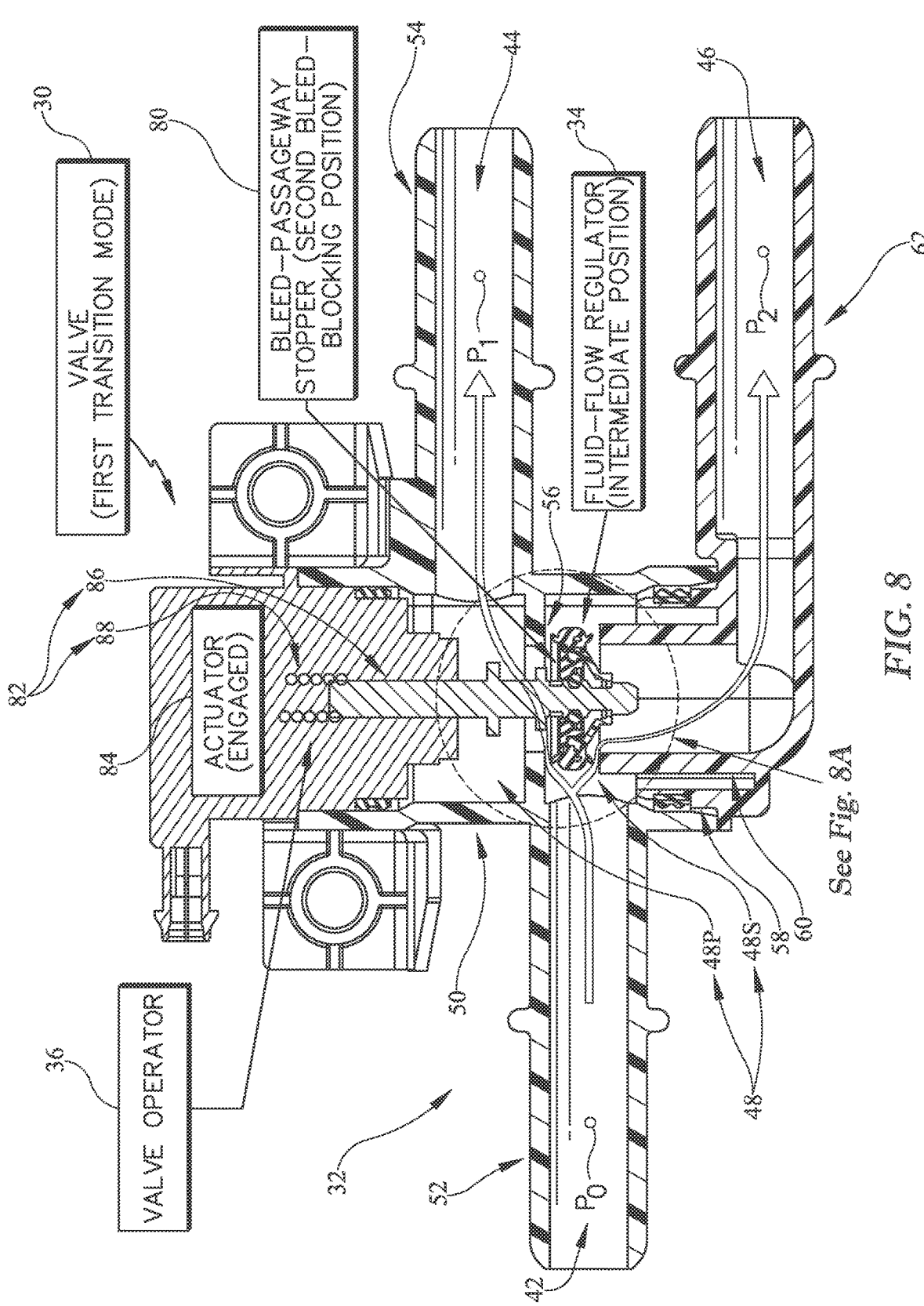
FIG. 8A is a detail view of FIG. 8 showing the bleed-passageway stopper engages an upper stopper seat on the fluid-flow regulator while in the second bleed-blocking position and the fluid-flow regulator is disengaged from the first valve seat on the valve housing while in the intermediate position to allow the flow of washer fluid through the inlet opening of the secondary washer passageway.
Figure 9:
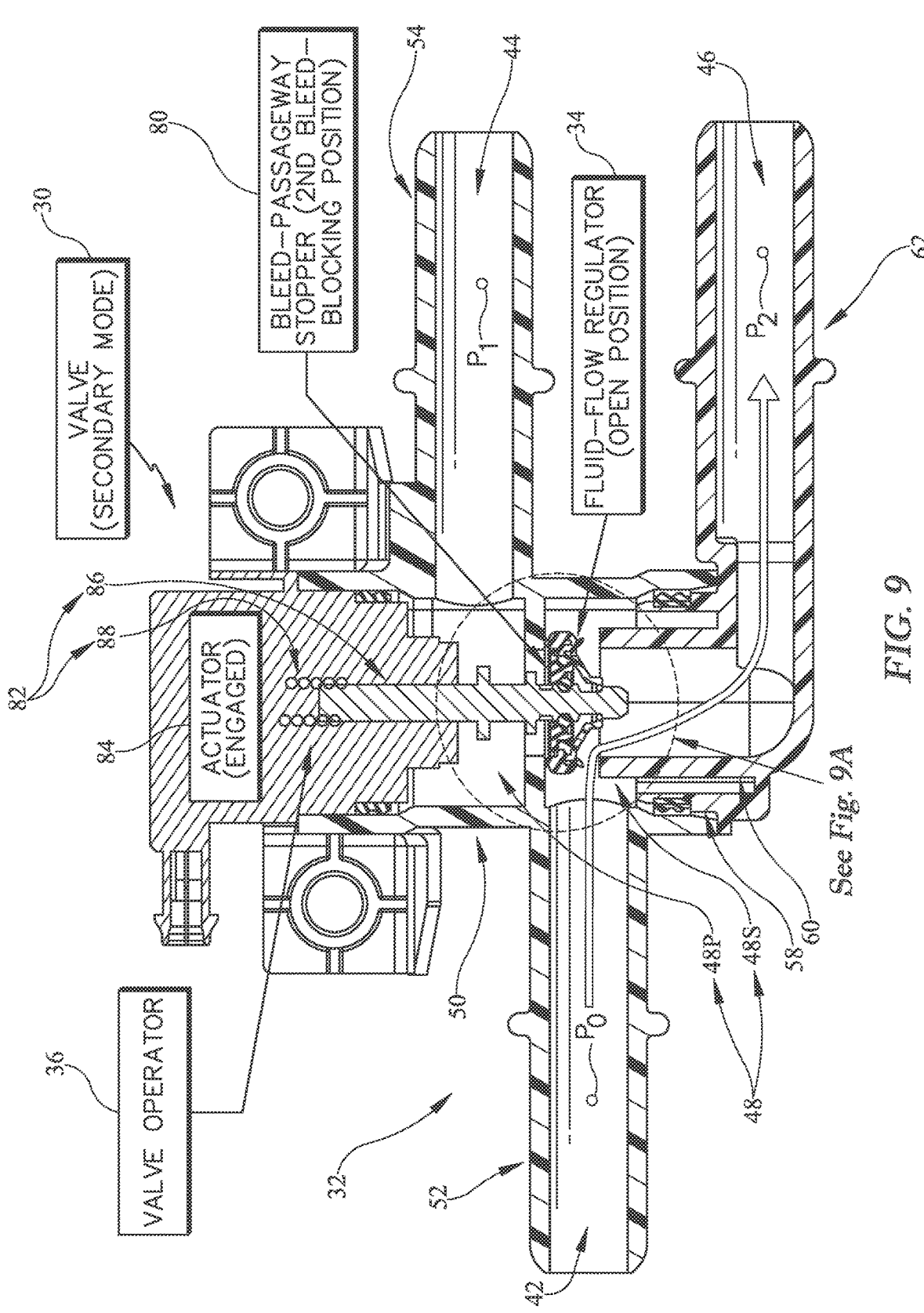
FIG. 9 is a cross-sectional view similar to FIG. 8 showing further upward movement of the stopper mover which causes the fluid-flow regulator to move to the opened position to fully open the second washer passageway while blocking the flow of washer fluid through the inlet opening of the primary washer passageway.
Figure 9A:
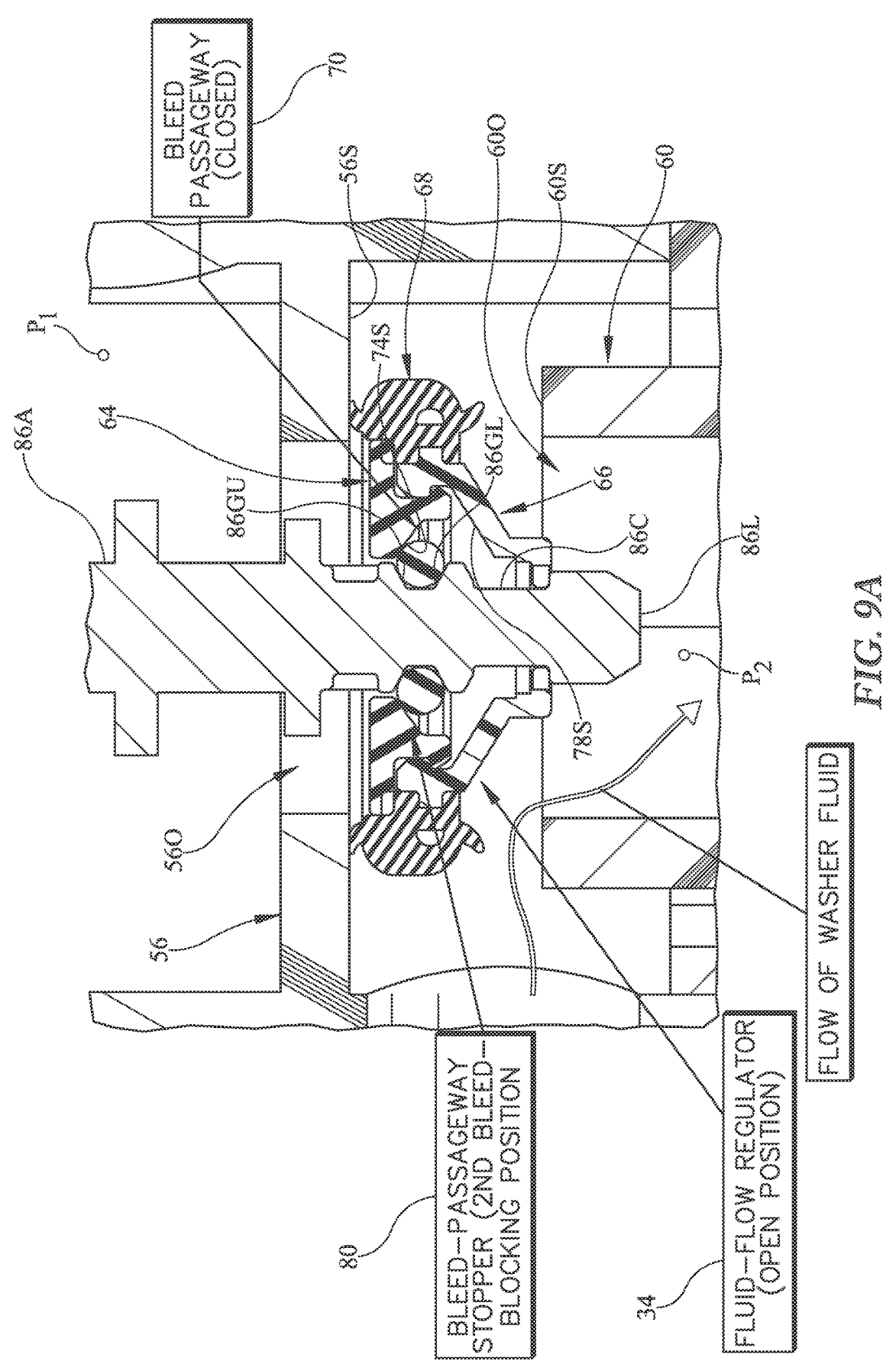
Figure 10:
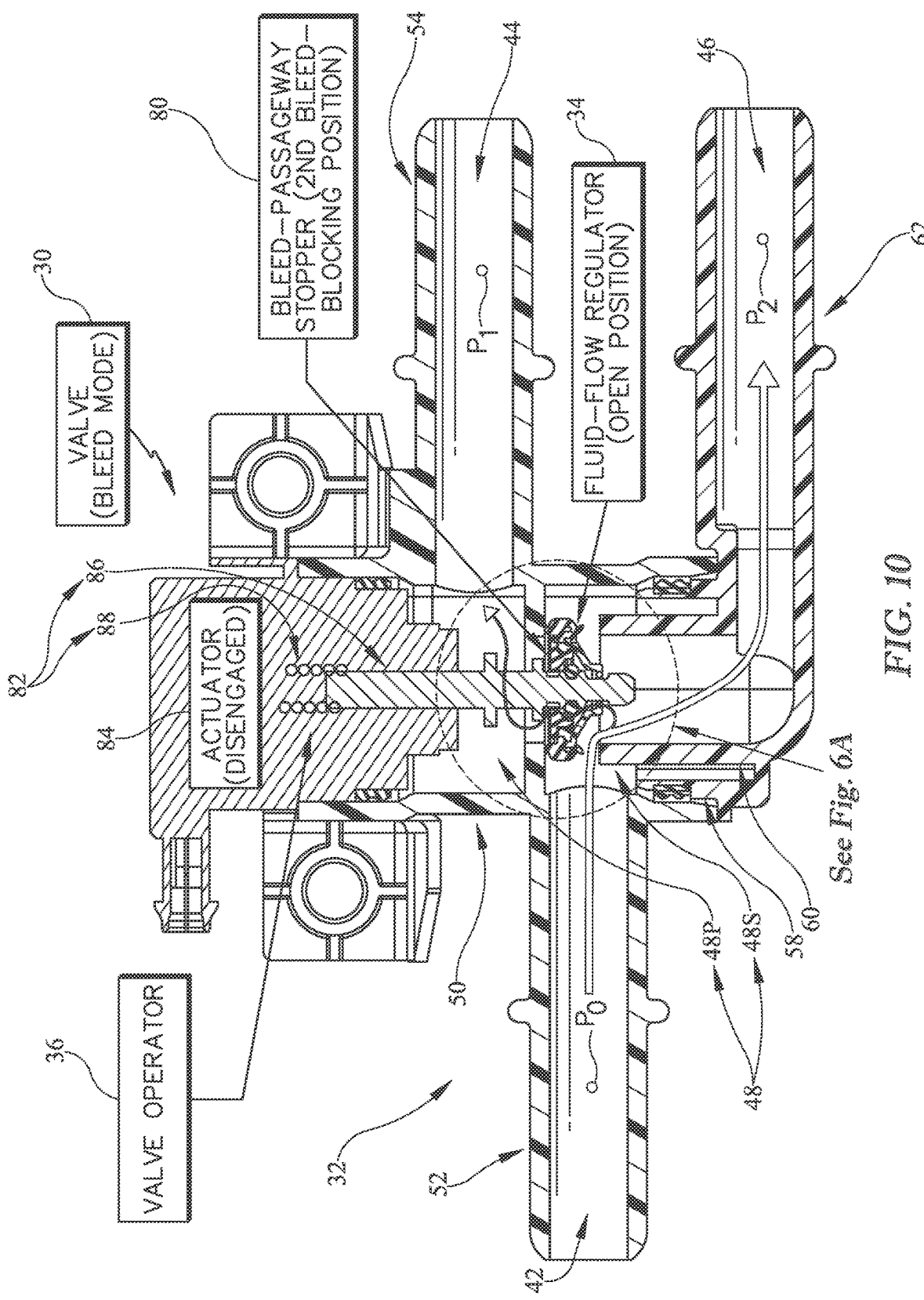
Figure 10A:
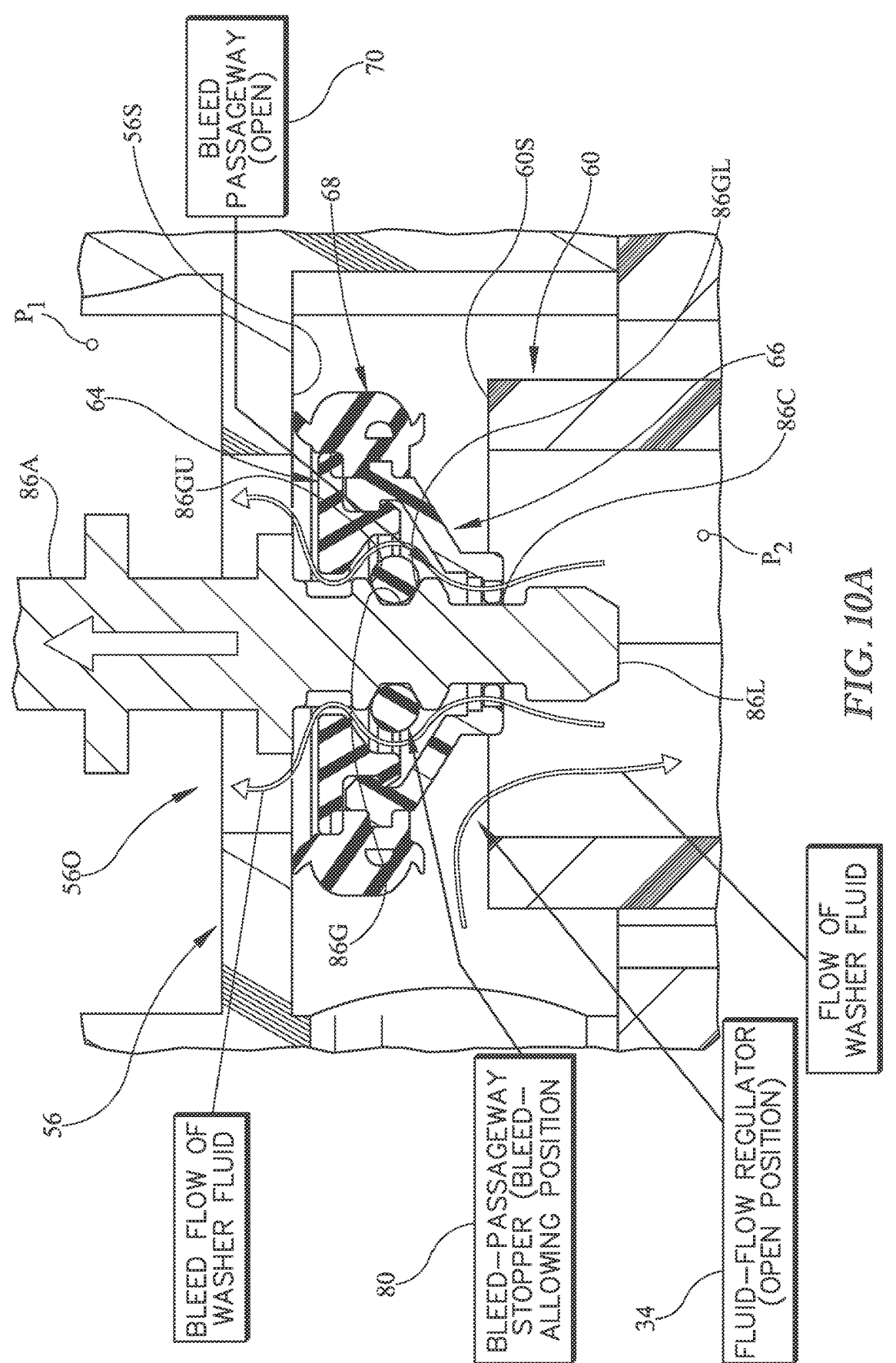
Figure 11:
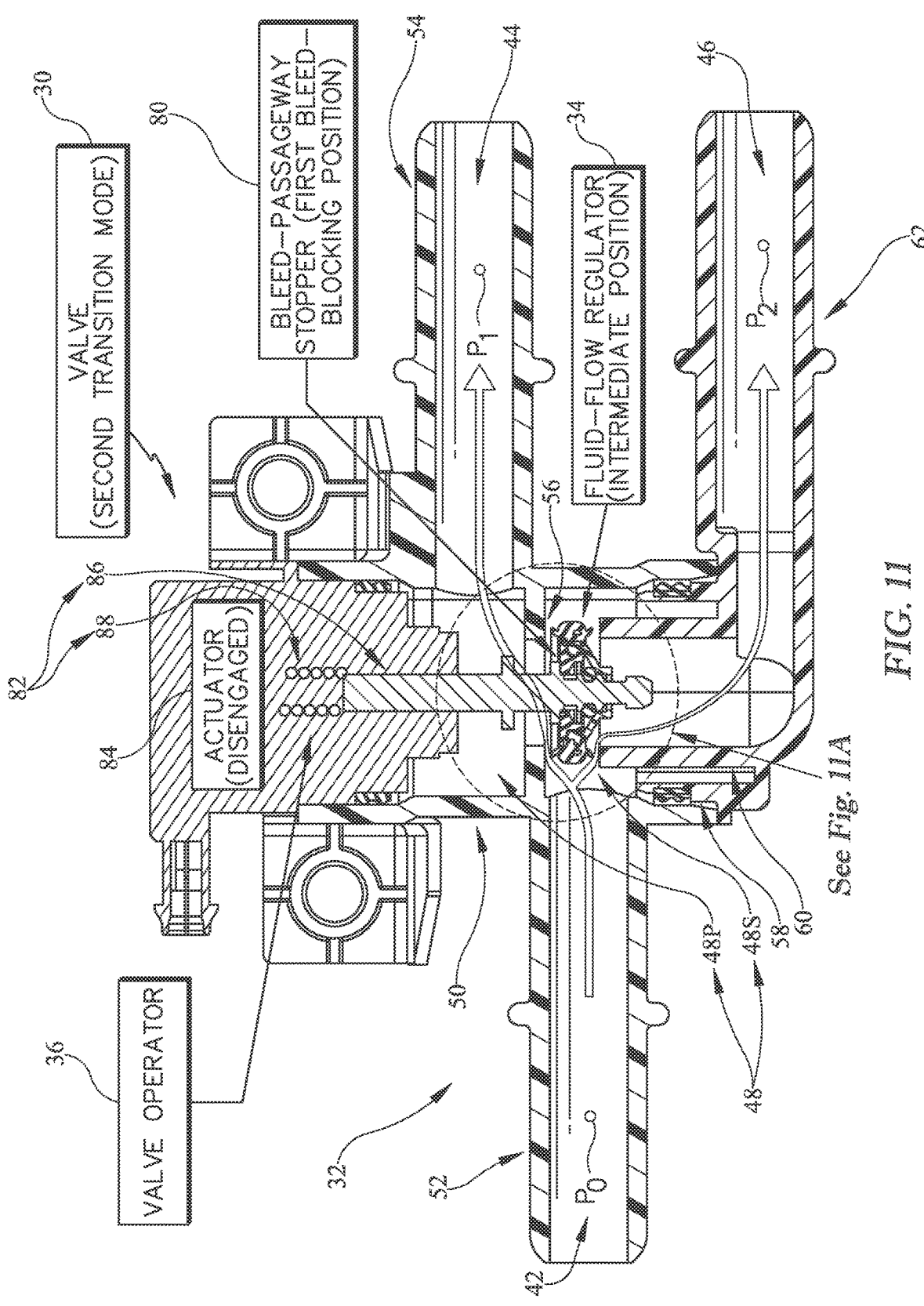
Figure 11A:
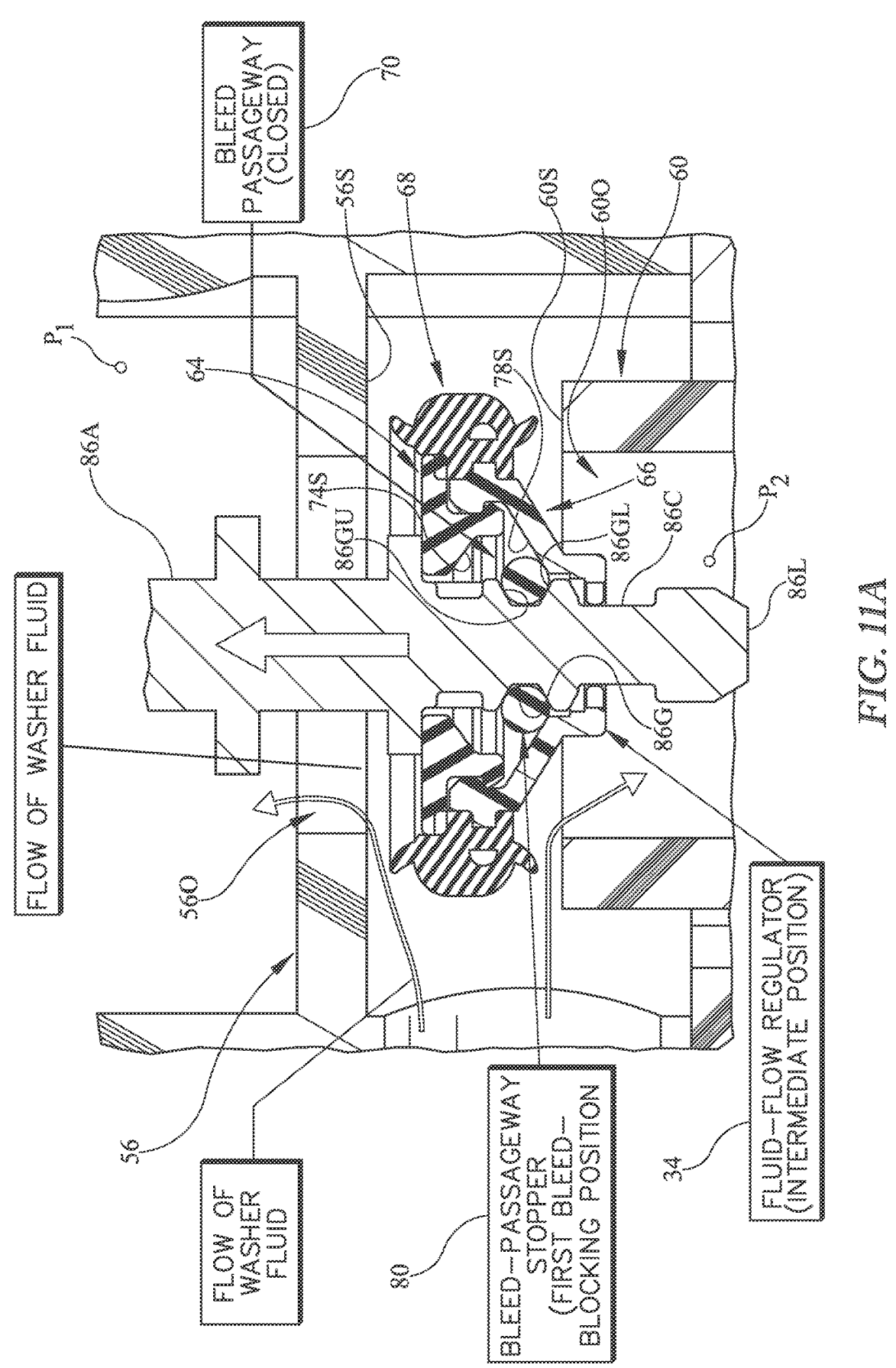

FIG. 9A is a detail view of FIG. 8 showing the bleed-passageway stopper remains engaged with the upper stopper seat on the fluid-flow regulator while in the second bleed-blocking position and the fluid-flow regulator is engaged with a second valve seat on the valve housing while in the opened position to block the flow of washer fluid through the inlet opening of the primary washer passageway so that the flow of washer fluid from the high-pressure fluid pump only flows to the secondary washer passageway;

FIG. 10 is a cross-sectional view similar to FIG. 9 showing downward movement of the stopper mover in response to removing an electrical signal from the actuator to cause the bleed-passageway stopper to move from the second bleed-blocking position to the bleed-allowing position to bleed the portion of the flow of washer fluid to flow through the bleed passageway to the primary washer passageway to begin to raise pressure in the primary washer passageway before the inlet opening of the primary washer passageway is fully opened as shown in FIG. 11;

FIG. 10A is a detail view of FIG. 10 showing the bleed-passageway stopper is disengaged from the fluid-flow regulator while in the bleed-allowing position to open the bleed passageway and the fluid-flow regulator remains in the open position;

FIG. 11 is a cross-sectional view similar to FIG. 10 showing further downward movement of the stopper mover in response to an electrical signal received by the the actuator to cause the bleed-passageway stopper to move from the bleed-allowing position to the first bleed-blocking position as the fluid-fluid flow regulator moves to the intermediate position to block the flow of washer fluid through the bleed passageway so that the flow of washer fluid from the high-pressure fluid pump flows to both the primary and secondary washer passageways; and FIG. 11A is a detail view of FIG. 11 showing the bleed-passageway stopper engages the lower stopper seat on the fluid-flow regulator while in the first bleed-blocking position and the fluid-flow regulator is disengaged from the second valve seat on the valve housing while in the intermediate position to allow the flow of washer fluid through the inlet opening of the primary washer passageway.

DETAILED DESCRIPTION

Figures 1, 2:
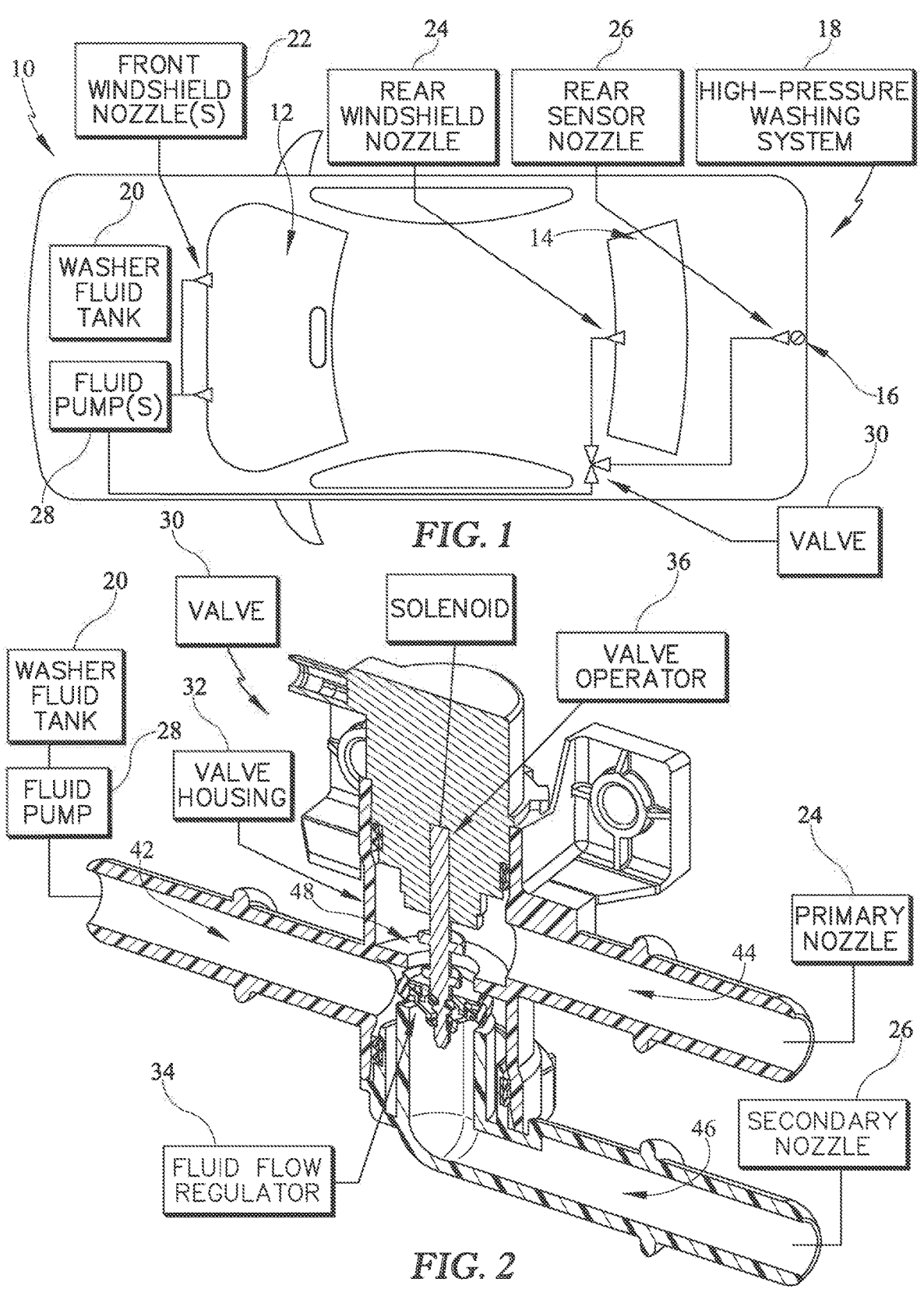

An illustrative high-pressure washing system 18 in accordance with the present disclosure is shown in FIG. 1. The high-pressure washing system 18 is adapted for use on a vehicle 10 to clean front and rear windshields 12, 14 of the vehicle 10. The high-pressure washing system 18 may also be configured to clean any sensors and/or cameras 16 on the vehicle 10 to ensure the proper function of the sensors and/or camera 16. For instance, a rear camera 16 at the rear windshield 14 of the vehicle 10 may need to be cleaned so that the rear camera 16 has clear visibility of the surroundings.

The high-pressure washing system 18 includes a washer fluid tank 20 configured to store a washer fluid, washer fluid nozzles 22, 24, 26 in fluid communication with the washer fluid tank 20, a high-pressure fluid pump 28, and a valve 30 as shown in FIGS. 1-4. The washer fluid nozzles 22, 24, 26 are each configured to spray washer fluid on different areas of the vehicle 10, such as the front and rear windshields 12, 14, sensors, and cameras 16 on the vehicle 10. The high-pressure fluid pump 28 is coupled in fluid communication with the washer fluid tank 20 to provide a flow of washer fluid to each of the nozzles 22, 24, 26. The valve 30 is coupled in fluid communication with the high-pressure fluid pump 28 to control the flow of washer fluid to the different nozzles 24, 26, i.e. the rear windshield nozzle 24 and the rear sensor nozzle 26.

Figure 3:
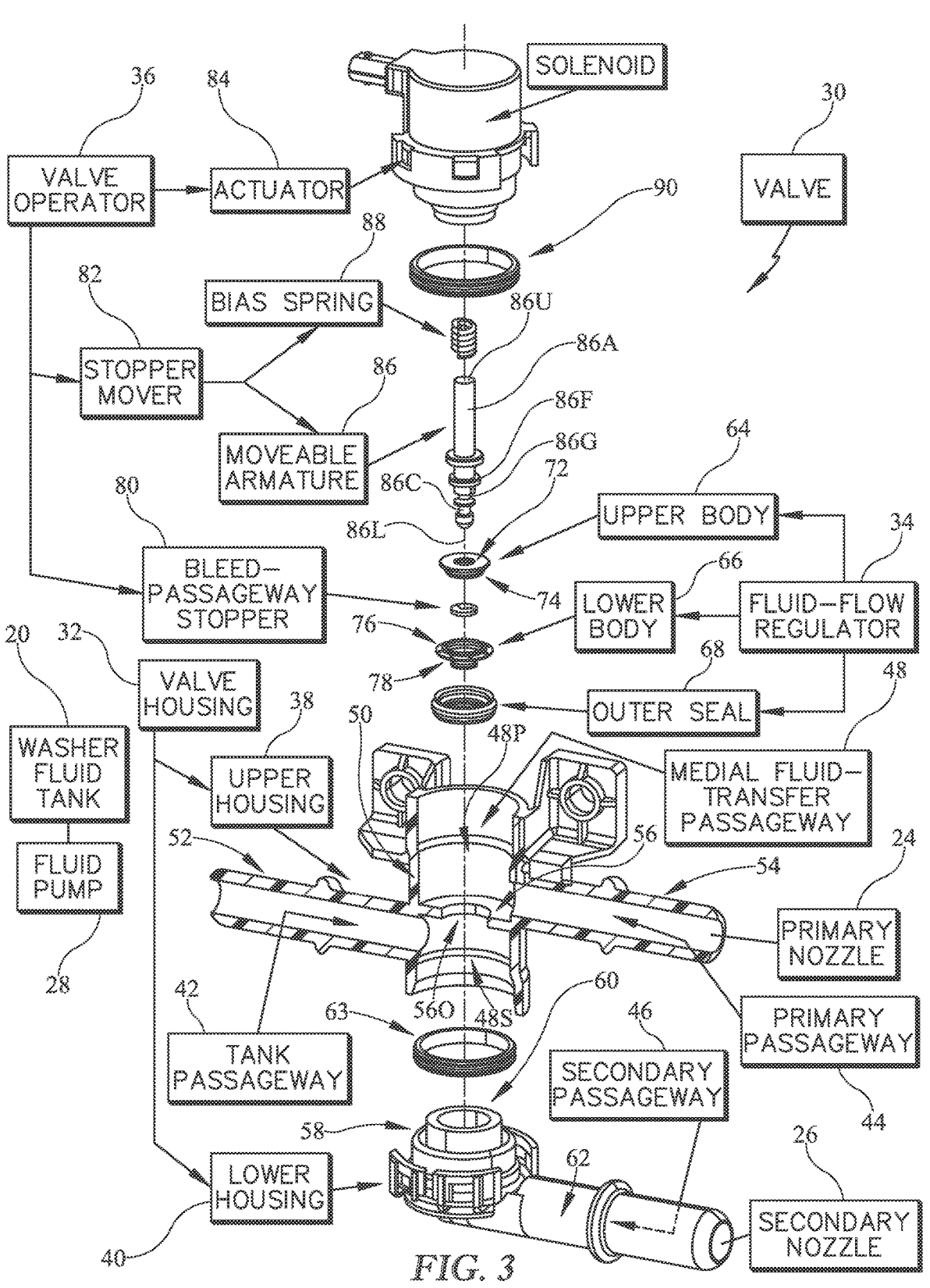
Figure 4:
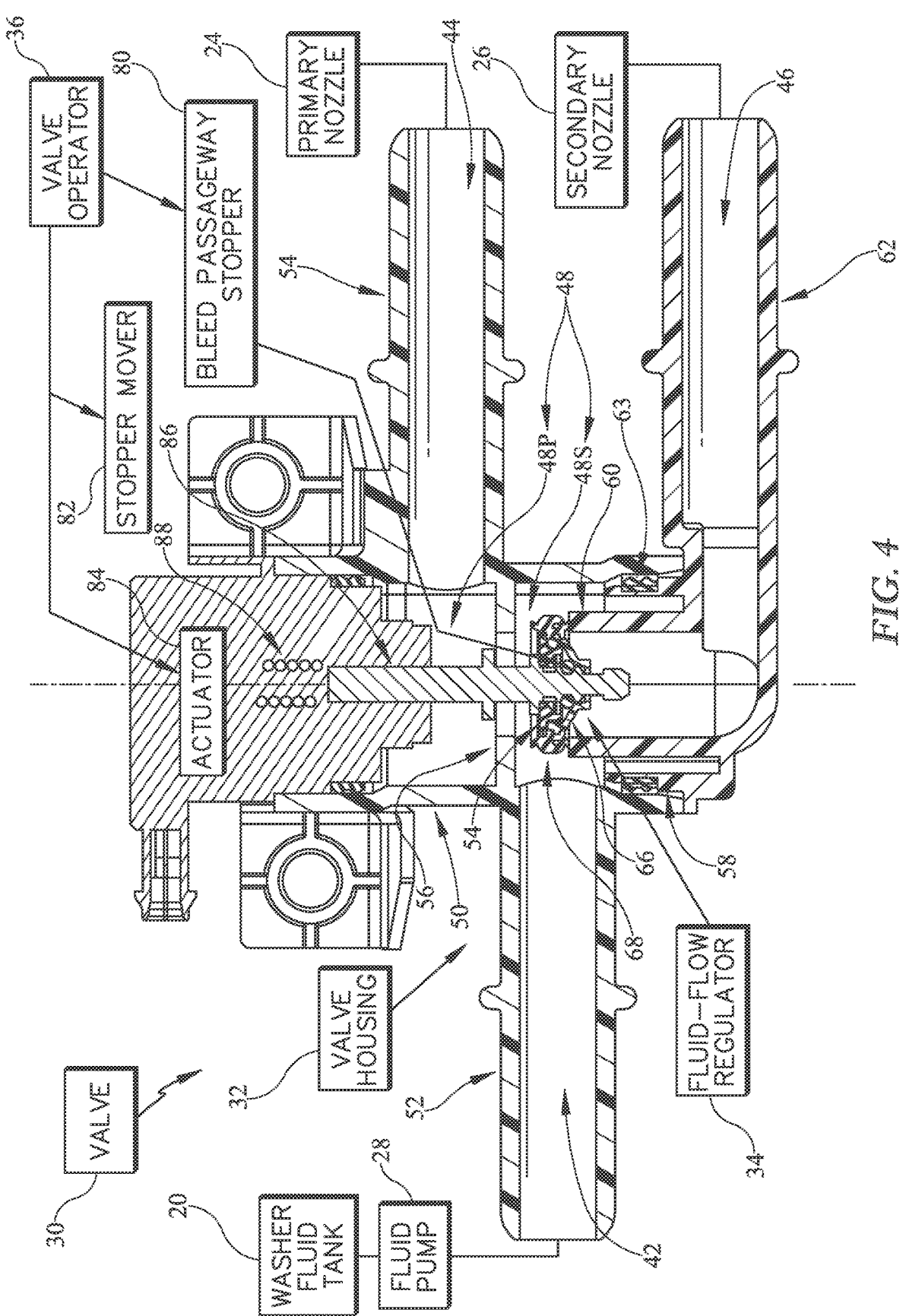
Figure 6:
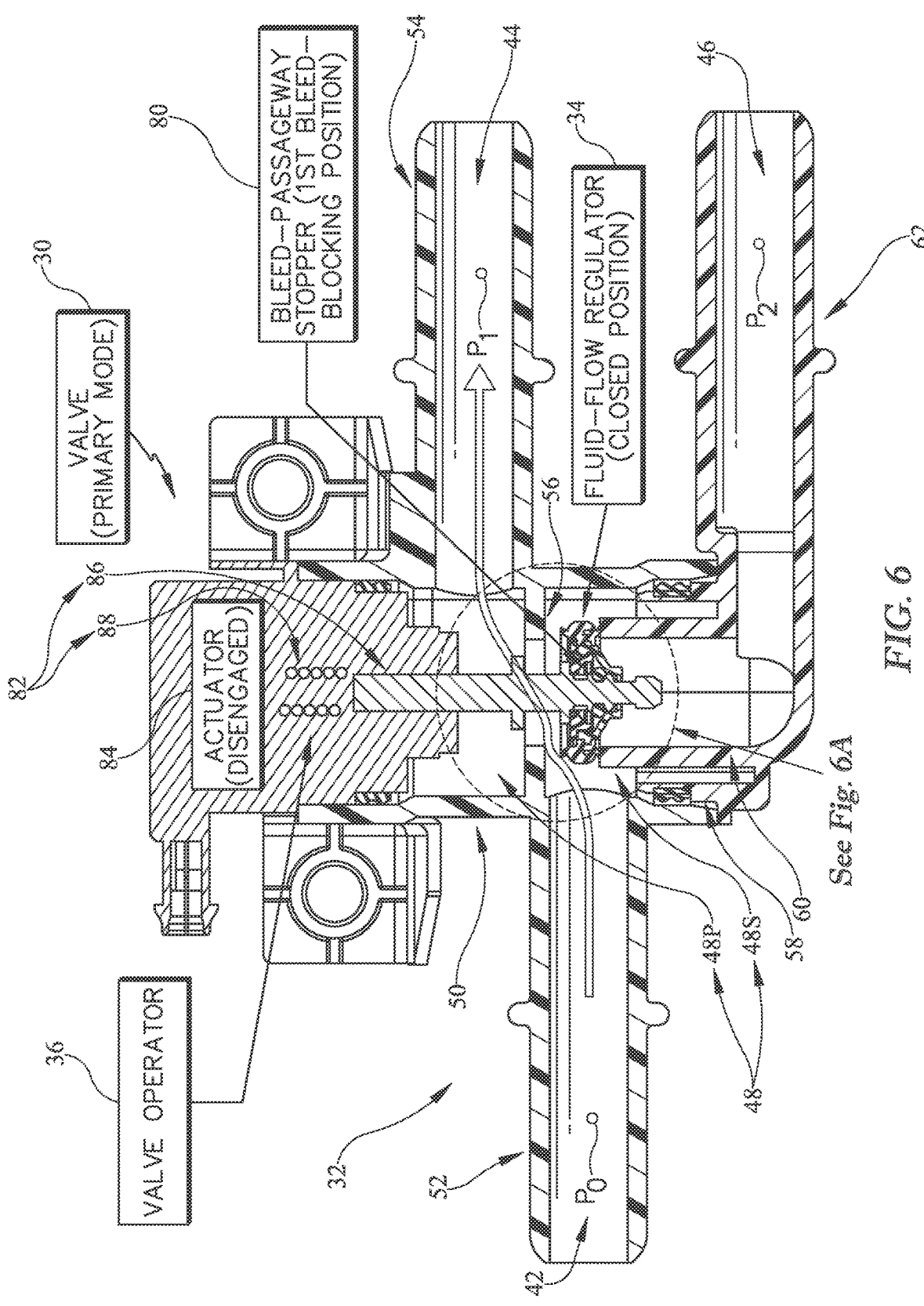

The valve 30 includes a valve housing 32, a fluid-flow regulator 34, and a valve operator 36 as shown in FIG. 2-4. The fluid-flow regulator 34 is mounted in the valve housing 32 for movement relative thereto along a vertical central axis A between a closed position as shown in FIG. 6, an intermediate position as shown in FIG. 8, and an opened position as shown in FIG. 9. The valve operator 36 is configured to control movement of the fluid-flow regulator 34 between the different positions to control the flow of fluid through the valve housing 32.

The valve housing 32 defines a tank passageway 42, a primary washer passageway 44 in fluid communication with the tank passageway 42, and a secondary washing passageway 46 in fluid communication with the tank passageway 42 as shown in FIGS. 2-4. The tank passageway 442 is adapted to be coupled in fluid communication with the high-pressure fluid pump 28 included in the high-pressure washing system 18 to receive the flow of washer fluid. The primary washer passageway 44 is adapted to be coupled in fluid communication to the primary nozzle 24 and the secondary washer passageway 46 is adapted to be coupled in fluid communication to a secondary nozzle 26.

The valve housing 32 also defines a medial fluid-transfer passageway 48 in fluid communication with the tank passageway 42, the primary washer passageway 44, and the secondary washer passageway 46 as shown in FIGS. 2-4. The medial transfer passageway 48 extends along the vertical central axis A. The fluid-flow regulator 34 is mounted in the medial fluid-transfer passageway 48 of the valve housing 32 for movement relative thereto along the vertical central axis A between the closed position as shown in FIG. 6, the intermediate position as shown in FIG. 8, and the opened position as shown in FIG. 9.

The primary nozzle 24 may be configured to clear the rear windshield 14 of the vehicle 10, while the secondary nozzle 26 cleans the rear camera 16 as suggested in FIG. 1. Being able to switch between the different nozzles 24, 26 while still providing a high-pressure flow of washer fluid may be important to quickly clean the rear camera 16. The system 18 may need to be able to deliver a large amount of washer fluid in a short time period to quickly clean the car sensors and/or cameras 16.

Figure 7:
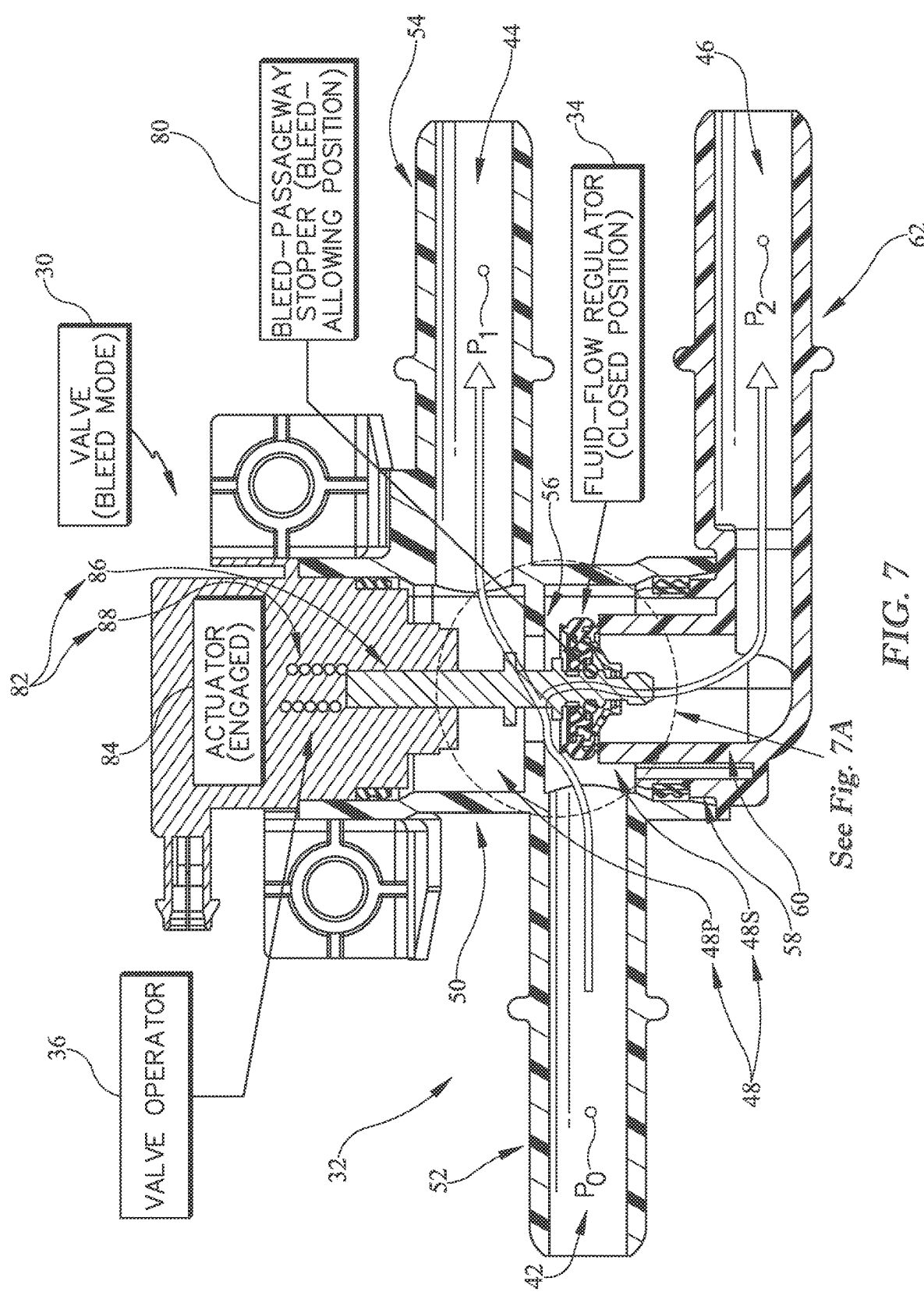

The valve operator 36 is configured to raise the pressure in the second washer passageway 46 as the fluid-flow regulator 34 is moved from the closed position to the opened position, or alternatively, raise the pressure in the primary washer passageway 44 as the fluid-flow regulator 34 is moved from the opened position to the closed position. The valve operator 36 raises the pressure by bleeding a portion of the flow of washer fluid through a bleed passageway 70 in the fluid-flow regulator 34 as shown in FIG. 7. In this way, pressure in the unopened washer passageway 44, 46 begins to rise relative to pressure in the other washer passageway 44, 46 before being fully opened.

This allows the size of the electrically powered actuator components included in the valve operator 36 to be reduced since the amount of force to switch between passageways 44, 46, can be reduced. In other words, a smaller, lighter solenoid may be used due to the valve operator 36 reducing the force to open the valve 30. Additionally, the high-pressure pump 28 is better able to provide enough washer fluid at a high enough pressure to quickly and efficiently clean the sensors and/or cameras 16.

The valve housing 32 includes an upper housing body 38 and a lower housing body 40 configured to be selectively coupled to the upper housing body 38 as shown in FIGS. 3 and 4. The lower housing body 40 of the valve housing 32 is coupled to the upper valve housing 38 to enclose components of the fluid-flow regulator 34 and the valve operator 36 within the valve housing 32. In the illustrative embodiment, the upper housing body 38 is formed to define the tank passageway 42, the primary washer passageway 44, and the medial fluid-transfer passageway 48 and the lower housing body 40 is formed to define the secondary washer passageway 46 as shown in FIGS. 2-4.

The upper housing body 38 includes an upper housing outer wall 50, a tank pipe 52, a primary nozzle pipe 54, and a partition plate 56 as shown in FIGS. 4 and 6-9A. The upper housing outer wall 50 extend circumferentially around the vertical central axis A to define the medial fluid-transfer passageway 48. The partition plate 56 is located in the medial fluid-transfer passageway 48 to divide the medial fluid-transfer passageway 48 into a primary chamber 48P and a secondary chamber 48S. The tank pipe 52 and the primary nozzle pipe 54 each extend radially from the upper housing outer wall 50. The tank pipe 52 defines the tank passageway 42, which opens to the secondary chamber 48S of the medial fluid-transfer passageway 48. The primary nozzle pipe 54 defines the primary washer passageway 44, which opens to the primary chamber 48P.

In the illustrative embodiment, the tank passageway 42, the primary washer passageway 44, and the secondary washer passageway 46 each extend perpendicular to the vertical central axis A or the vertical stopper-motion axis 86A. The tank pipe 52, the primary nozzle pipe 54, and the secondary nozzle pipe 56 each extend perpendicular to the vertical central axis A or the vertical stopper-motion axis 86A.

The lower housing body 40 includes a lower housing outer wall 58, a lower housing inner wall 60, and a secondary nozzle pipe 62 as shown in FIGS. 4 and 6-9A. The lower housing outer wall 58 extends circumferentially around the vertical central axis A. The lower housing inner wall 60 extends circumferentially around the vertical central axis A radially inward of the lower housing outward wall 58 so that the outer wall 58 surrounds the inner wall 60. The lower housing inner wall 60 defines a portion of the secondary washer passageway 46. The secondary nozzle pipe 62 extends radially from the lower housing inner wall 60 to define a portion of the secondary washer passageway 46. In the illustrative embodiment, the lower housing inner wall 58 and the secondary nozzle pipe 62 define the secondary washer passageway 46 as shown in FIGS. 4-9A.

A portion of the lower housing outer wall 60 and the lower housing inner wall 60 are arranged in an opening of the upper housing outer wall 50 as shown in FIGS. 4 and 6-9A. The lower housing outer wall 58 and the lower housing inner wall 60 close the opening to the secondary chamber 48S of the medial fluid-transfer passageway 48. In the illustrative embodiment, a scal member 63 is arranged around the lower housing outer wall 58 so that the seal member 63 located radially between the upper housing outer wall 50 and the lower housing outer wall 58 when the lower housing body 40 is coupled to the upper housing body 38 to seal therebetween.

The fluid-flow regulator 34 includes an upper body 64, a lower body 66, and an outer seal 68 as shown in FIGS. 3-9A. The upper body 64 extends circumferentially about the vertical central axis A and the lower body 66 extends circumferentially about the vertical central axis A. The lower body 66 is coupled to the upper body 64 for movement therewith. The outer seal 68 is coupled to the lower body 66 for movement therewith.

Figures 5, 5A:
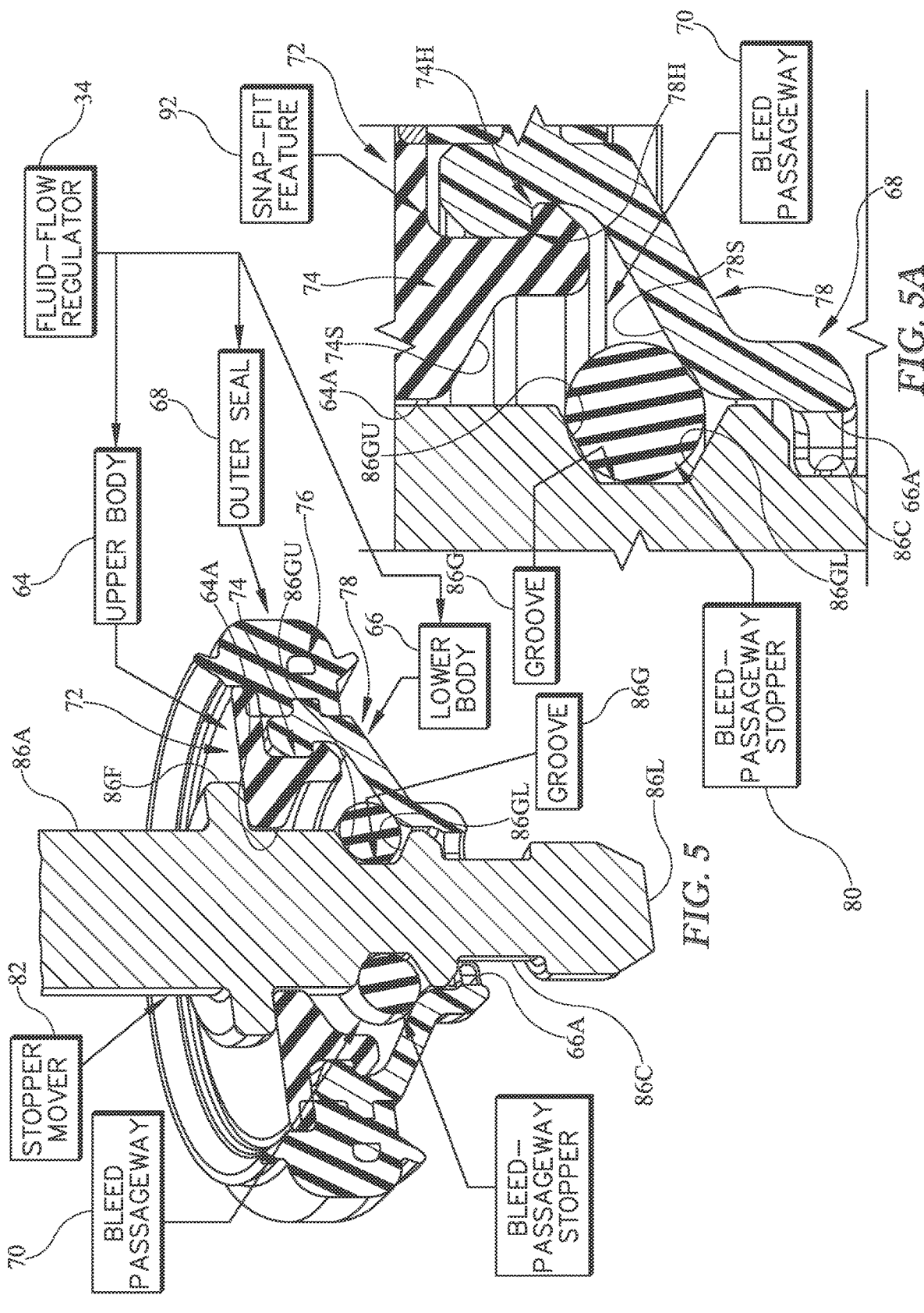

The upper body 64 and the lower body 66 extend circumferentially around the valve operator 36 to define the bleed passageway 70 as shown in FIGS. 5 and 5A. The upper body 64 is shaped to define an upper aperture 64A and the lower body 66 is shaped to define a lower aperture 66A as shown in FIGS. 3A and 5-9A. The upper and lower apertures 64A, 66A provide inlet and outlets of the bleed passageway 70.

In the illustrative embodiment, the outer seal 68 is coupled to the lower body 66 of the fluid-flow regulator 34. In some embodiments, the outer seal 68 may be coupled to the upper body 64 of the fluid-flow regular 34.

In the illustrative embodiment, the lower body 66 of the fluid-flow regulator 34 is over molded with the outer seal 68 as shown in FIGS. 5 and 5A. In some embodiments, the outer seal 68 may be coupled to either one of the upper body 64 and the lower body 66 of the fluid-flow regular 34 using another suitable method.

Figure 3A:
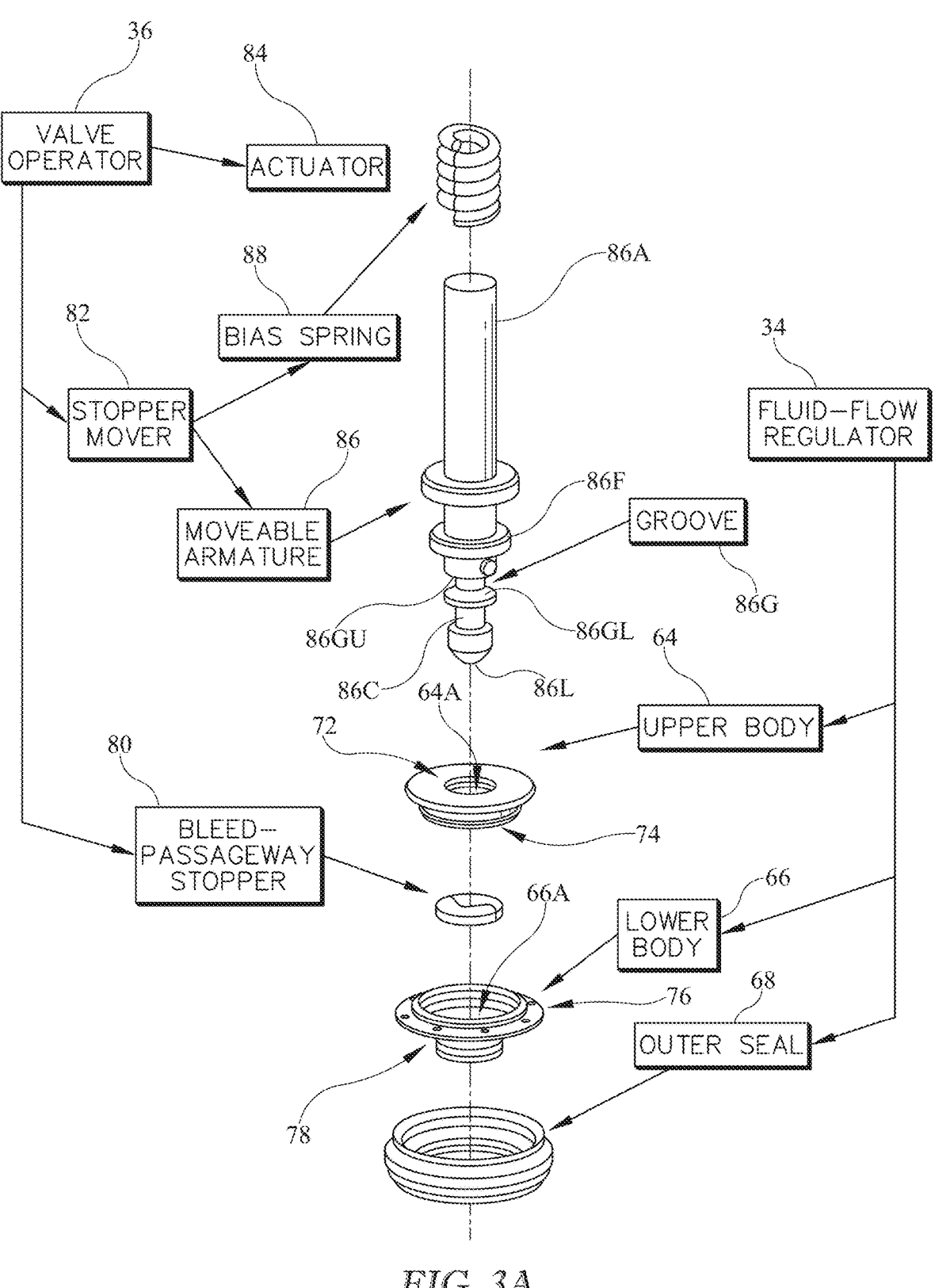

In the illustrative embodiment, the upper body 64 of the fluid-flow regulator 34 includes an upper rim 72 and an upper wall 74 as shown in FIGS. 3A, 5, and 5A. The upper rim 72 extends circumferentially about the vertical central axis A. The upper wall 74 extends axially away from the upper rim 72 and circumferentially about the vertical central axis A.

The upper arm 74 defines the upper stopper seat 74S in the illustrative embodiment. The upper stopper seat 74 is angled relative to the vertical central axis A as shown in FIGS. 5-9A.

In the illustrative embodiment, the lower body 66 of the fluid-flow regulator 34 includes a lower rim 76 and a lower wall 78 as shown in FIGS. 3A, 5, and 5A. The lower rim 76 extends circumferentially about the vertical central axis A. The lower wall 78 extends axially away from the lower rim 76 and circumferentially about the vertical central axis A.

The lower wall 78 defines the lower stopper seat 78S in the illustrative embodiment. The lower stopper seat 78S is angled relative to the vertical central axis A as shown in FIGS. 5-9A.

In the illustrative embodiment, the upper body 64 and the lower body 66 of the fluid-flow regulator 34 have a snap-fit feature 92 as shown in FIG. 5A. The snap-fit feature 92 couples the lower body 66 with the upper body 64 for movement therewith as shown in FIGS. 5 and 5A. Each of the upper body 64 and the lower body 66 has opposite extending snap hooks 74H, 78H that interlock to couple the lower body 66 with the upper body 64.

In the illustrative embodiment, the upper wall 74 defines the upper snap hook 74H and the lower wall 76 defines the lower snap hook 76H as shown in FIG. 5A. The upper and lower snap hooks 74, 76 interlock to couple the lower body

66 with the upper body 64. In some embodiments, the upper and lower body 64, 66 may be coupled using another suitable method.

The valve operator 36 includes a bleed-passageway stopper 80, a stopper mover 82, and an actuator 84 as shown in FIGS. 3-9A. The bleed-passageway stopper 80 is coupled to the stopper mover 82 for movement therewith. The stopper mover 82 is arranged to move up and down relative to the valve housing 32 along a vertical stopper-motion axis 86A that is coextensive with the vertical central axis A. The actuator 84 is configured to move the stopper mover 82 and the bleed-passageway stopper 80 coupled thereto up and down relative to the valve housing 32.

The stopper mover 82 is arranged to apply a force to urge the bleed-passageway stopper 80 to a first bleed-blocking position to cause the fluid-flow regulator 34 to be in the closed position as shown in FIG. 6. The actuator 84 is configured to move the stopper mover 82 in opposition to the force applied by the stopper mover 82, and thus move the bleed-passageway stopper 80 in response to an electrical input.

The actuator 84 is configured to move the stopper mover 82 in opposition to the force applied by the stopper mover 82 to cause the bleed-passageway stopper 80 to move from the first bleed-blocking position to a bleed-allowing position, while the fluid-flow regulator 34 remains in the closed position as shown in FIG. 7. This allows the portion of the flow of washer fluid to flow through the bleed passageway 70 so that pressure $P_2$ in the secondary washer passageway 46 begins to rise relative to pressure $P_1$ in the primary washer passageway 44 before the secondary washing passageway 46 is fully opened.

The actuator 84 is also configured to continue to move the bleed-passageway stopper 80 in opposition to the force applied by the stopper mover 82 from the bleed-allowing position to a second bleed-blocking position, which causes the fluid-flow regulator 34 to move from the closed position to the intermediate position as shown in FIG. 8. This blocks the flow of washer fluid through the bleed passageway 70 so that the flow of washer fluid from the high-pressure fluid pump 28 flows to both the primary and secondary washer passageways 44, 46 prior to closing of the primary passageway 44 as shown in FIG. 9.

As the actuator 84 moves the stopper mover 82 further upward in opposition to the force applied by the stopper mover 82, the fluid-flow regulator 34 is moved to the opened position as shown in FIG. 9 to fully open the second washer passageway 46 while blocking the flow of washer fluid through the inlet opening 56O of the primary washer passageway 44. The actuator 84 is configured hold the bleed-passageway stopper 80 in the second bleed-blocking position to cause the fluid flow regulator 34 to remain in the opened position.

Upon receipt of an electrical signal to the actuator 84, the stopper mover 82 and/or actuator 84 can apply a force to move the bleed-passageway stopper 80 from the second bleed-blocking position to the bleed-allowing position, while the fluid-flow regulator 34 remains in the opened position as shown in FIGS. 10 and 10A. This allows the portion of the flow of washer fluid to flow through the bleed passageway 70 so that pressure $P_1$ in the primary washer passageway 44 begins to rise relative to pressure $P_2$ in the secondary washer passageway 46 before the primary washing passageway 44 is fully opened again.

The stopper mover 82 continue to apply the force to move the bleed-passageway stopper 80 from the bleed-allowing position back to the first bleed-blocking position, which causes the fluid-flow regulator 34 to move from the opened position to the intermediate position as shown in FIGS. 11 and 11A. This blocks the flow of washer fluid through the bleed passageway 70 so that the flow of washer fluid from the high-pressure fluid pump 28 flows to both the primary and secondary washer passageways 44, 46. As the stopper mover 82 applies the force to move the bleed-passageway stopper 80 further downward, the fluid-flow regulator 34 is moved back to the closed position to fully re-open the primary washer passageway 44 while blocking the flow of washer fluid through the inlet opening 60O of the secondary washer passageway 46.

The stopper mover 82 includes a movable armature 86 and a bias member 88 as shown in FIGS. 3-9A. The movable armature 86 is coupled to the actuator 84 or the solenoid 84. The movable armature 86 is configured to extend along a vertical stopper-motion axis 86A that is parallel to and aligned with the vertical central axis A. The moveable armature 86 is spring-biased by the bias member 88 toward the lower housing 40.

The bias member 88 applies the force to the movable armature 86, which in turn applies the force to the bleed-passageway stopper 80 coupled to the movable armature 86. The movable armature 86 is operationally linked to the actuator 84 to move the armature 86 upwardly away from the lower housing 40 when the actuator 84 is energized.

The moveable armature 86 includes an armature body 86B and a locating flange 86F as shown in FIGS. 3-9A. The armature body 86B extends axially between a proximal or upper end 86U engaged with the actuator 87 and a distal or lower end 86L that extends through the fluid-flow regulator 34. The locator flange 86F extends radially outward from the armature body 86B of the stopper mover 82 relative to the vertical central axis A and extends circumferentially around the armature body 86B.

In the illustrative embodiment, the locating flange 86F engages the fluid-flow regulator 34 during downward movement of the stopper mover 82 to block further axial movement of the stopper mover 82 as shown in FIG. 6. The locating flange 86F also helps the stopper mover 82 apply the force to urge the bleed-passageway stopper 80 to the first bleed-blocking position as shown in FIG. 6.

The armature body 86B of the moveable armature 86 is formed to define a groove 86G and a channel 86C as shown in FIGS. 3-9A. The groove 86G extends circumferentially around the vertical stopper-motion axis 86A at a location axially between the flange 86F and the lower end 86L of the armature body 86B. The channel 86C extends circumferentially around the vertical stopper-motion axis 86A at a location axially between the groove 86G and the lower end 86L of the armature body 86B.

The groove 86G has a trapezoidal cross-section when viewed in a circumferentially direction as shown in FIGS. 5-9A. The groove 86G receives the bleed-passageway stopper 80. The angled side surfaces 86 GU, 86GL of the groove 86G help engage the bleed-passageway stopper 80 with upper and lower stopper seats 74S, 78S formed on the fluid-flow regulator 34 as shown in FIGS. 4-9A. Near the distal end 86L, the stopper mover has a ramp surface that make installation of the bleed-passageway stopper 86 into the groove 86G on the stopper mover 82 easier and reduces possible damage to the bleed-passageway stopper 80 during assembly.

The upper body 64 and the lower body 66 of the fluid-flow regulator 34 extend circumferentially around the bleed-passageway stopper 80 and the movable armature 86 of the stopper mover 82 relative to the vertical central axis A to define the bleed passageway 70 with the bleed-passageway stopper 80 located in the bleed passageway 70 as shown in FIGS. 5 and 5A. In the illustrative embodiment, the upper and lower body 64, 66 are snapped together around the bleed-passageway stopper 80 and the movable armature 86 of the stopper mover 82.

Figure 7A:
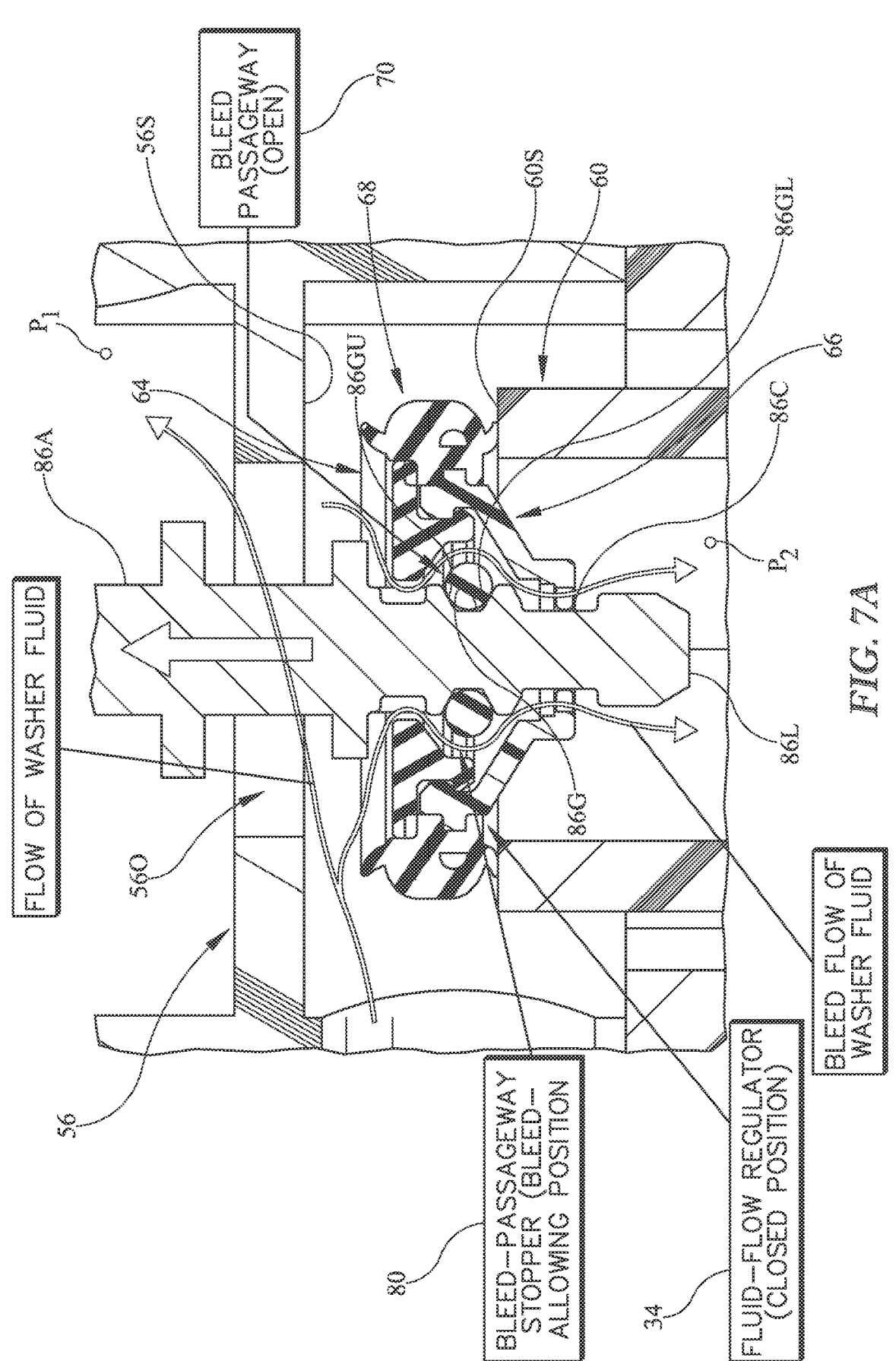
Figure 8A:
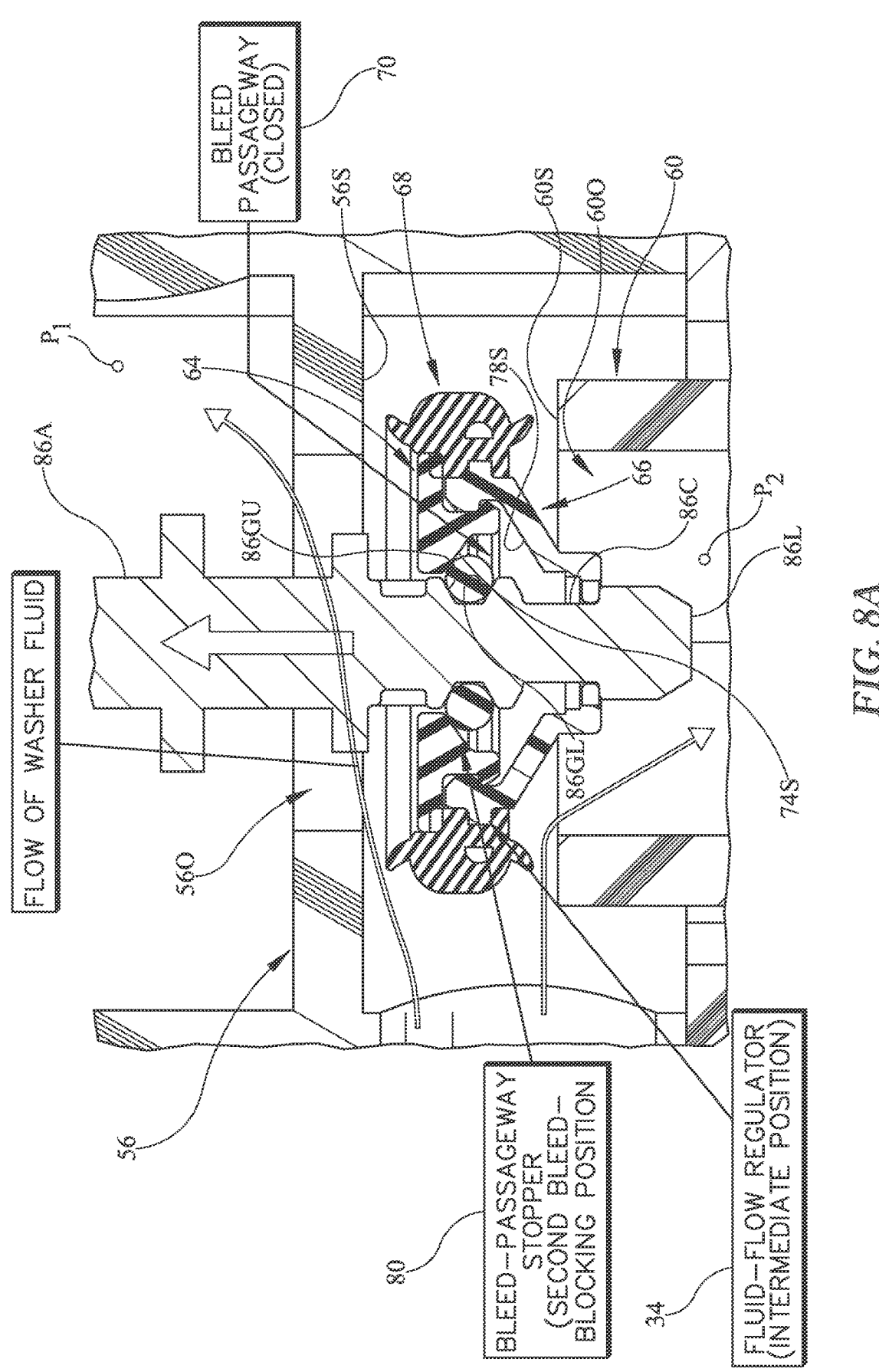

Normally, the valve 30 is in a primary mode as shown in FIGS. 6 and 6 so that the flow of washer fluid flows through the primary washer passageway 44 to the primary washer nozzle 24, i.e. the rear windshield nozzle on the vehicle 10, while blocking the flow of washing fluid through the secondary washer passageway 46 to the secondary washer nozzle 26, i.e. the rear sensor/camera nozzle 26 on the vehicle 10. To switch the flow of washing fluid to the secondary washer passageway 46, the valve 30 changes to a bleed mode as shown in FIGS. 7 and 7A so that a bleed flow of washing fluid is bleed to the secondary washer passageway 46 to begin to rise relative to the pressure in the washer passageways 44, 46. The valve 30 then changes to a first transition mode as shown in FIGS. 8 and 8A so that washing fluid flows to both passageways 44, 46. Finally, the valve 30 changes to a secondary mode as shown in FIGS. 9 and 9A so that the flow of washer fluid flows through the secondary washer passageway 46 to the secondary washer nozzle 26, while blocking the flow of washing fluid through the primary washer passageway 44 to the primary washer nozzle 24.

To switch the flow of washing fluid back to the primary washer passageway 44, the valve 30 changes to a bleed mode so that a bleed flow of washing fluid is bled to the primary washer passageway 44 to begin to rise relative to the pressure in the washer passageways 44, 46. The vale 30 then changes to a first transition mode so that washing fluid flows to both passageways 44, 46. Finally, the valve 30 changes back to the primary mode so that the flow of washing fluid flows through the primary washer passageway 44 to the primary washer nozzle 24.

Figure 6A:
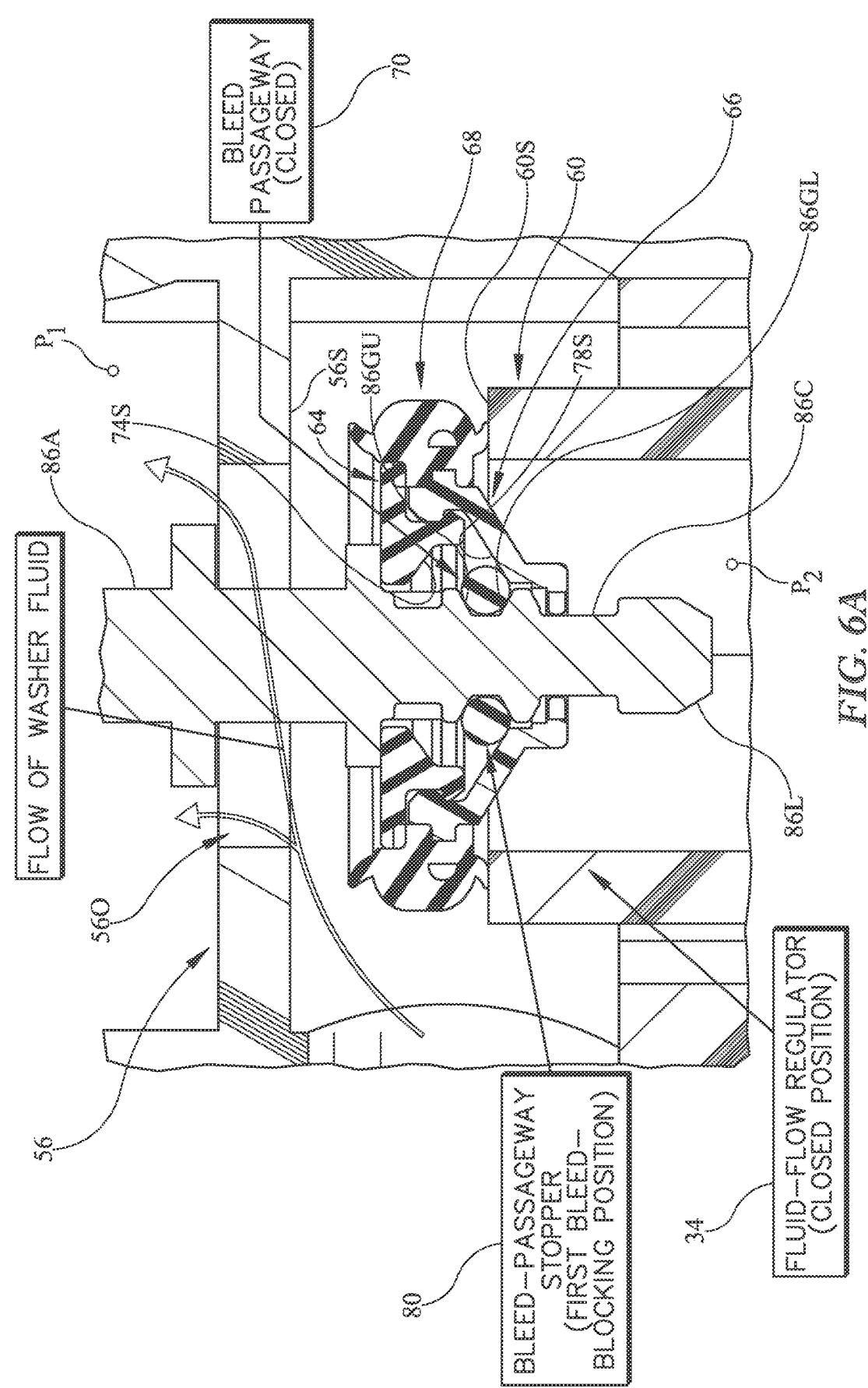

In FIGS. 6 and 6A, the valve 30 is in the primary mode in which the flow of washer fluid flows through the primary washer passageway 44 to the primary washer nozzle 24, i.e. the rear windshield nozzle on the vehicle 10. In the primary mode, the actuator 84 and the stopper mover 82 urges the movable armature 86 with the bleed-passageway stopper 80 coupled thereto to be in the first bleed-blocking position while the fluid-fluid flow regulator 34 is in the closed position. This blocks the flow of washer fluid through the inlet opening 60O of the secondary washer passageway 46 so that the flow of washer fluid from the high-pressure fluid pump only flows through the primary washer passageway 44 to the primary nozzle 24.

In the first bleed-blocking position, the bleed-passageway stopper 80 engages a lower stopper seat 78S on the lower body 66 of the fluid-flow regulator 34 as shown in FIGS. 6 and 6A. This not only causes the fluid-flow regulator 34 to be in the closed position as shown in FIGS. 6 and 6A, but also blocks the flow of fluid through the bleed passageway 70. The locating flange 86F on the moveable armature 86 of the stopper mover 82 engages the upper body 64 of the fluid-flow regulator 34 to help apply the force to the fluid-flow regulator 34. The bleed-passageway stopper 80 engages the lower stopper seat 78S on the lower body 66 of the fluid-flow regulator 34 to close of the aperture 66A to block the flow of fluid through the bleed passageway 70 such that the bleed passageway 70 is closed as shown in FIG. 6A.

In the closed position, the outer seal 68 of the fluid-flow regulator 34 engages a first valve seat 60S on the valve housing 32 to block the flow of washer fluid through the inlet opening 60O of the secondary washer passageway 46 so that the flow of washer fluid from the high-pressure fluid pump 28 only flows through the primary washer passageway 44 to the primary nozzle 24 as shown in FIGS. 6 and 6A. The outer seal 68 of the fluid-flow regulator 34 engages the first valve seat 60S on the valve housing 32 and is spaced apart from the second valve seat 56S on the valve housing 32 to allow fluid to flow through the opening 56O in the valve housing 32 when the fluid-flow regulator 34 is in the closed position. In the illustrative embodiment, the first valve seat 60S is defined by the lower housing inner wall 60 and the second valve seat 56S is defined by the partition plate 56.

The outer seal 68 engages the first valve seat 60S to block the flow of washer fluid through the inlet opening 60O of the secondary washer passageway 46. Thus, the flow of washing fluid from the high-pressure fluid pump 28 only flows through inlet opening 56O of the primary washer passageway 44 to the primary nozzle 24 as shown in FIGS. 6 and 6A.

In the primary mode, the pressure $P_1$ in the primary washer passageway 44 is greater than the pressure $P_2$ in the secondary washer passageway 46 as suggested in FIGS. 6 and 6A. To begin to raise the pressure $P_2$ in the secondary washer passageway 46, the valve 30 moves to a bleed mode as shown in FIGS. 7 and 7A.

In FIGS. 7 and 7A, the valve 30 is in a bleed mode in which a bleed flow from the flow of washer fluid is allowed to flow through the bleed passageway 70 to the secondary washer passageway 46 to begin to raise the pressure therein. In the bleed mode, upward movement of the movable armature 86 of the stopper mover 82 causes the bleed-passageway stopper 80 to move from the first bleed-blocking position to the bleed-allowing position as shown in FIGS. 7 and 7A.

In the bleed-allowing position, the bleed-passageway stopper 80 is disengaged from the fluid-flow regulator 34 such that the bleed-passageway stopper 80 is spaced apart from both upper and lower stopper seats 64S, 66S on the fluid-flow regulator 34 as shown in FIGS. 7 and 7A. This allows the bleed flow from of the flow of washer fluid to flow through the bleed passageway 70 to the secondary washer passageway 46 to begin to raise pressure $P_2$ in the secondary washer passageway 46 relative to pressure $P_1$ in the primary washer passageway 44 before the inlet opening 60O of the secondary washer passageway 46 was fully opened as shown in FIG. 8.

In the bleed mode, the fluid-flow regulator 34 remains in the closed position as shown in FIGS. 7 and 7A. The fluid-flow regulator 32 remains in the closed position in the bleed mode because there is a small clearance between the upper and lower body 64, 66 of the fluid-flow regulator 34 so that as the stopper mover 82 moves the bleed-passageway stopper 80 from the first bleed-blocking position to the second bleed-blocking position that movement is not transferred to the fluid-flow regulator 34.

In some configurations, the bleed flow through the bleed passageway 70 causes pressure P2 in the secondary washer passageway 46 to exceed the pressure P1 in the primary washer passageway 44. In this way, the pressure P2 developed in the secondary passageway 46 overcomes pressure P1 in the primary passageway 44 and the bias spring 88. Subsequently, the pressure P2 activates motion of the fluid flow regulator 34 to the intermediate position shown in FIG. 8A and ultimately to the open position shown in FIG. 9A. Configurations with this operation can be characterized in that the secondary nozzle 26 may be a relatively high-pressure restriction causing development of a higher back-pressure P2 than the back pressure P1 developed by the primary nozzle 24 that is a relatively low-pressure restriction.

In FIGS. 8 and 8A, the valve 30 is in a first transition mode in which upward movement of the stopper mover 82 is transferred to the fluid-flow regulator 34 to begin moving the fluid-flow regulator 34 to the opened position. As the movable armature 86 of the stopper mover 82 continues to move upward in response to the electrical signal, the bleed-passageway stopper 80 engages the fluid-flow regulator 34 and blocks the bleed flow through the bleed passageway 70. Engagement of the bleed-passageway stopper 80 with the fluid-flow regulator 34 causes the fluid-flow regulator 34 to begin moving with the stopper mover 82 as well.

In FIGS. 8 and 8A, the bleed-passageway stopper 80 has moved from the bleed-allowing position to the second bleed-blocking position thereby blocking the flow of washer fluid through the bleed passageway 70. In the second bleed-blocking position, the bleed-passageway stopper 80 engages an upper stopper seat 74S on the upper body 64 of the fluid-flow regulator 34 as shown in FIGS. 8-9A. This causes the fluid-fluid flow regulator 34 to move to the intermediate position so that the flow of washer fluid from the high-pressure fluid pump flows to both the primary and secondary washer passageways 44, 46.

In the intermediate position, the fluid-flow regulator 34 is disengaged from the first valve seat 60S on the valve housing 32 to allow the flow of washer fluid through the inlet opening 60O of the secondary washer passageway 46. The outer seal 68 is spaced apart and disengaged from the first valve seat 60S and the second valve seat 56S on the valve housing 32 so that the flow of washer fluid from the high-pressure fluid pump 28 flows to both the primary washer passageway 44 and the secondary washer passageway 46. The outer seal 68 of the fluid-flow regulator 34 is disengaged from both the first valve seat 60S and the second valve seat 56S on the valve housing 32 to allow fluid to flow through the opening 56O, 60O in the valve housing 32 when the fluid-flow regulator 34 is in the intermediate position.

In FIGS. 9 and 9A, the valve 30 is in the secondary mode in which the flow of washer fluid flows through the secondary washer passageway 46 to the secondary washer nozzle 24, i.e. the rear sensor/camera nozzle 26 for the rear sensor/camera 16 on the vehicle 10. In the secondary mode, the stopper mover 82 has reached the top of the upward stroke which causes the fluid-flow regulator 34 to move to the opened position to fully open the second washer passageway 46 while blocking the flow of washer fluid through the inlet opening 56O of the primary washer passageway 44. This not only causes the fluid-flow regulator 34 to be in the open position as shown in FIGS. 9 and 9A, but also blocks the flow of fluid through the bleed passageway 70.

In the secondary mode, the bleed-passageway stopper 80 remains engaged with the upper stopper seat 74S on the fluid-flow regulator 34 in the second bleed-blocking position as shown in FIGS. 9 and 9A. The bleed-passageway stopper 80 engages the fluid-flow regulator in the second bleed-blocking position so that the stopper mover 82 pulls the outer seal 68 of the fluid-flow regulator 34 into engagement with the second valve seat 56S on the valve housing 32 to close the inlet opening 56O of the primary washer passageway 44. The bleed-passageway stopper 80 engages the upper stopper seat 74S on the fluid-flow regulator 34 to close of the aperture 66A to block the flow of fluid through the bleed passageway 70 such that the bleed passageway 70 is closed as shown in FIG. 9A.

In the opened position, the outer seal 68 of the fluid-flow regulator 34 is engaged with the second valve seat 56S on the valve housing 32 to block the flow of washer fluid through the inlet opening 56O of the primary washer passageway 44 so that the flow of washer fluid from the high-pressure fluid pump only flows to the secondary washer passageway 46 as shown in FIGS. 9 and 9A. The outer seal 68 of the fluid-flow regulator 34 engages the second valve seat 56S on the valve housing 32 and is spaced apart from the first valve seat 60S on the valve housing 32 to allow fluid to flow through the opening 60O in the valve housing 32 when the fluid-flow regulator 34 is in the open position.

The outer seal 68 engages the second valve seat 56S to block the flow of washer fluid through the inlet opening 56O of the primary washer passageway 44. Thus, the flow of washing fluid from the high-pressure fluid pump 28 only flows through inlet opening 60O of the secondary washer passageway 46 to the secondary nozzle 26 as shown in FIGS. 9 and 9A.

A high-pressure washing system 18 includes a washer fluid tank 20 configured to store a washer fluid, a high-pressure fluid pump 28 coupled in fluid communication with the washer fluid tank 20 to provide a flow of washer fluid, and a valve 30 coupled in fluid communication with the high-pressure fluid pump 28 to receive the flow of washer fluid. The valve 30 is configured to control the flow of washer fluid to one of a primary nozzle 24 and a secondary nozzle 26 included on the vehicle 10.

The valve 30 includes a valve housing 32 and a fluid-flow regulator 34 as shown in FIGS. 2-5. The valve housing 32 is formed to include a tank passageway 42 coupled in fluid communication to the high-pressure fluid pump 28 to receive the flow of washer fluid, a primary washer passageway 44 in fluid communication with the tank passageway 42 and coupled in fluid communication to the primary nozzle 24, and a secondary washer passageway 46 in fluid communication with the tank passageway 42 and coupled in fluid communication to the secondary nozzle 26. The fluid-flow regulator 34 is mounted for movement relative to the valve housing 32 from a closed position as shown in FIGS. 6 and 6A to an open position as shown in FIGS. 9 and 9A. In the closed position, the fluid-flow regulator engages a first valve seat 60S on the valve housing 32 to block the flow of washer fluid through an inlet opening 60O of the secondary washer passageway 46 so that the flow of washer fluid from the high-pressure fluid pump only flows through the primary washer passageway 44. In the opened position, the fluid-flow regulator 34 engages a second valve seat 56S on the valve housing 32 to block the flow of washer fluid through an inlet opening 56O of the primary washer passageway 44 so that the flow of washer fluid from the high-pressure fluid pump only flows through the secondary washer passageway 46.

The valve 30 further includes valve-operating means for raising pressure in the secondary washer passageway 46 by bleeding a portion of the flow of washer fluid flowing from the tank passageway 42 to the primary washer passageway 44 to the secondary washer passageway 46 through a bleed passageway 70 in the fluid-flow regulator 34 in response to an electrical input so that pressure $P_2$ in the secondary washer passageway 46 begins to rise relative to pressure P1 in the primary washer passageway 44 before the inlet opening 60O of the secondary washer passageway 46 is fully opened.

The valve 30 further includes valve-operating means for raising pressure in the primary washer passageway 44 by bleeding a portion of the flow of washer fluid flowing from the tank passageway 42 to the secondary washer passageway 46 to the primary washer passageway 44 through the bleed passageway 70 in the fluid-flow regulator 34. Pressure in the primary washer passageway 44 begins to rise before the inlet opening 56O of the primary washer passageway 44 is fully opened so as to reduce the amount of force needed move the fluid-flow regulator 34 from the opened position to the closed position to allow the flow of washer fluid to flow from the tank passageway 42 through the primary washer passageway 44 to the primary nozzle 24.

The valve-operating means, or the valve operator 36, includes a bleed-passageway stopper 80 and a stopper mover 82 arranged to apply a force to urge the bleed-passageway stopper 80 to a first bleed-blocking position as shown in FIGS. 6 and 6A. In the first bleed-blocking position, the bleed-passageway stopper 80 engages the fluid-flow regulator 34 to block the flow of washer fluid into the secondary washer passageway 46.

The valve-operating means, or the valve operator 36, further includes actuator means for moving the bleed-passageway stopper 80 in opposition to the force applied by the stopper mover 80 from the first bleed-blocking position to a bleed-allowing position as shown in FIGS. 7 and 7A to allow the portion of the flow of washer fluid to flow through the bleed passageway 70. The valve-operating means, or the valve operator 36, further includes actuator means for moving the bleed-passageway stopper 80 in opposition to the force applied by the stopper mover 82 from the bleed-allowing position to a second bleed-blocking position as shown in FIGS. 9 and 9A. In the second bleed-blocking position, the bleed-passageway stopper 80 engages the fluid-flow regulator 34 to block the portion of the flow of washer fluid from flowing through the bleed passageway 70 to cause the fluid-flow regulator 34 to move from the closed position to the opened position so that the flow of washer fluid flows from the tank passageway 42 through the secondary washer passageway 46 to the secondary nozzle 26.

In the illustrative embodiment, the fluid-flow regulator 34 extends circumferentially around the bleed-passageway stopper 80 and the stopper mover 82 relative to the vertical stopper-motion axis 86A to define the bleed passageway 70 with the bleed-passageway stopper 80 located in the bleed passageway 70.

The invention claimed is:

1. A high-pressure washing system comprising:
a washer fluid tank configured to store a washer fluid,
a high-pressure fluid pump coupled in fluid communication with the washer fluid tank to provide a flow of washer fluid, and
a valve coupled in fluid communication with the high-pressure fluid pump to receive the flow of washer fluid and configured to control the flow of washer fluid to one of a primary nozzle and a secondary nozzle, the valve comprising
a valve housing formed to include a tank passageway coupled in fluid communication to the high-pressure fluid pump to receive the flow of washer fluid, a primary washer passageway in fluid communication with the tank passageway and coupled in fluid communication to the primary nozzle, and a secondary washer passageway in fluid communication with the tank passageway and coupled in fluid communication to the secondary nozzle,
a fluid-flow regulator mounted for movement relative to the valve housing from a closed position in which the fluid-flow regulator engages a first valve seat on the valve housing to block the flow of washer fluid through an inlet opening of the secondary washer passageway so that the flow of washer fluid from the high-pressure fluid pump only flows through the primary washer passageway to an opened position in which the fluid-flow regulator engages a second valve seat on the valve housing to block the flow of washer fluid through an inlet opening of the primary washer passageway so that the flow of washer fluid from the high-pressure fluid pump only flows through the secondary washer passageway, and valve-operating means for raising pressure in the secondary washer passageway by bleeding a portion of the flow of washer fluid flowing from the tank passageway to the primary washer passageway to the secondary washer passageway through a bleed passageway in the fluid-flow regulator in response to an electrical input so that pressure in the secondary washer passageway rises to meet or exceed pressure in the primary washer passageway before the inlet opening of the secondary washer passageway is fully opened, wherein the valve-operating means includes a bleed-passageway stopper and a stopper mover arranged to apply a force to urge the bleed-passageway stopper to a first bleed-blocking position in which the bleed-passageway stopper engages the fluid-flow regulator to block the flow of washer fluid into the secondary washer passageway, and wherein the valve housing has a medial fluid-transfer passageway in fluid communication with the tank passageway, the primary washer passageway, and the secondary washer passageway that extends along a vertical central axis, the stopper mover is arranged to move up and down relative to the valve housing along a vertical stopper-motion axis that is coextensive with the vertical central axis, and the tank passageway, the primary washer passageway, and the secondary washer passageway extends perpendicular to the vertical stopper-motion axis.

2. The high-pressure washing system of claim 1, wherein the valve further comprises valve-operating means for raising pressure in the primary washer passageway by bleeding a portion of the flow of washer fluid flowing from the tank passageway to the secondary washer passageway to the primary washer passageway through the bleed passageway in the fluid-flow regulator so that pressure in the primary washer passageway begins to rise relative to pressure in the secondary washer passageway before the inlet opening of the primary washer passageway is fully opened so as to reduce the amount of force needed move the fluid-flow regulator from the opened position to the closed position.

3. The high-pressure washing system of claim 1, wherein the fluid-flow regulator extends circumferentially around the bleed-passageway stopper and the stopper mover relative to the vertical stopper-motion axis to define the bleed passageway with the bleed-passageway stopper located in the bleed passageway.

4. The high-pressure washing system of claim 3, wherein the fluid-flow regulator includes a lower body and an upper body coupled to the lower body, the lower body formed to define a lower stopper seat engaged by the bleed-passageway stopper when the bleed-passageway stopper is in the first bleed-blocking position, and the upper body formed to define an upper stopper seal engaged by the bleed-passageway stopper when the bleed-passageway stopper is in a second bleed-blocking position.

5. The high-pressure washing system of claim 1, wherein the stopper mover is formed to include a groove that extends circumferentially around the vertical stopper-motion axis and the bleed-passageway stopper is coupled to the stopper mover in the groove.

6. The high-pressure washing system of claim 5, wherein the groove on the stopper mover has a trapezoidal cross-section when viewed in a circumferential direction.

7. A valve adapted for use in a high-pressure washing system, the valve comprising:

a valve housing formed to include a tank passageway adapted to be coupled in fluid communication with a high-pressure fluid pump included in the high-pressure washing system to receive a flow of washer fluid, a primary washer passageway in fluid communication with the tank passageway and adapted to be coupled in fluid communication with a primary nozzle included in the high-pressure washing system, and a secondary washer passageway in fluid communication with the tank passageway and adapted to be coupled in fluid communication with a secondary nozzle included in the high-pressure washing system, a fluid-flow regulator mounted for movement relative to the valve housing between a closed position in which the fluid-flow regulator engages a first valve seat on the valve housing to block the flow of washer fluid through an inlet opening of the secondary washer passageway and an opened position in which the fluid-flow regulator engages a second valve seat on the valve housing to block the flow of washer fluid through an inlet opening of the primary washer passageway, and valve-operating means for raising pressure in the secondary washer passageway by bleeding a portion of the flow of washer fluid flowing from the tank passageway to the primary washer passageway to the secondary washer passageway through a bleed passageway in the fluid-flow regulator in response to a first electrical input so that pressure in the secondary washer passageway begins is raised before the inlet opening of the secondary washer passageway is fully opened, wherein the valve-operating means includes a bleed-passageway stopper and a stopper mover arranged to apply a force to urge the bleed-passageway stopper to a first bleed-blocking position in which the bleed-passageway stopper engages the fluid-flow regulator to block the flow of washer fluid into the secondary washer passageway, and wherein the fluid-flow regulator includes a lower body and an upper body coupled to the lower body, the lower body formed to define a lower stopper seat engaged by the bleed-passageway stopper when the bleed-passageway stopper is in the first bleed-blocking position, and the upper body formed to define an upper stopper seal engaged by the bleed-passageway stopper when the bleed-passageway stopper is in a second bleed-blocking position.

8. The valve of claim 7, wherein the valve further comprises valve-operating means for raising pressure in the primary washer passageway by bleeding a portion of the flow of washer fluid flowing from the tank passageway to the secondary washer passageway to the primary washer passageway through the bleed passageway in the fluid-flow regulator in response to a second electrical input so that pressure in the primary washer passageway rises before the inlet opening of the primary washer passageway is fully opened.

9. The valve of claim 7, wherein the valve housing has a medial fluid-transfer passageway in fluid communication with the tank passageway, the primary washer passageway, and the secondary washer passageway that extends along a vertical central axis, the stopper mover is arranged to move up and down relative to the valve housing along a vertical stopper-motion axis that is coextensive with the vertical central axis, and the tank passageway, the primary washer passageway, and the secondary washer passageway extends perpendicular to the vertical stopper-motion axis.

10. The valve of claim 9, wherein the fluid-flow regulator extends circumferentially around the bleed-passageway stopper and the stopper mover relative to the vertical stopper-motion axis to define the bleed passageway with the bleed-passageway stopper located in the bleed passageway.

11. The valve of claim 7, wherein the stopper mover is formed to include a groove that extends circumferentially around a vertical stopper-motion axis of the stopper mover and the bleed-passageway stopper is coupled to the stopper mover in the groove.

12. The valve of claim 11, wherein the groove on the stopper mover has a trapezoidal cross-section when viewed in a circumferentially circumferential direction.

13. A valve adapted for use in a high-pressure washing system, the valve comprising:

a valve housing formed to include a tank passageway, a primary washer passageway in fluid communication with the tank passageway, and a secondary washer passageway in fluid communication with the tank passageway, a fluid-flow regulator mounted for movement relative to the valve housing between a closed position in which the fluid-flow regulator engages a first valve seat on the valve housing to block a flow of washer fluid from the tank passageway through an inlet opening of the secondary washer passageway and an opened position in which the fluid-flow regulator engages a second valve seat on the valve housing to block the flow of washer fluid from the tank passageway through an inlet opening of the primary washer passageway, and a valve operator configured to raise pressure in one washer passageway of the primary and secondary washer passageways by bleeding a portion of the flow of washer fluid flowing from the tank passageway to an other of the primary and the secondary washer passageways to the one washer passageway of the primary and secondary washer passageways through a bleed passageway in the fluid-flow regulator so that pressure in the one washer passageway begins to rise before the inlet opening of the one washer passageway is fully opened, wherein the valve operator includes a bleed-passageway stopper and a stopper mover arranged to apply a force to urge the bleed-passageway stopper to a first bleed-blocking position in which the bleed-passageway stopper engages the fluid-flow regulator to block the flow of washer fluid into the secondary washer passageway, and wherein the stopper mover is formed to include a groove that extends circumferentially around a vertical stopper-motion axis of the stopper mover and the bleed-passageway stopper is coupled to the stopper mover in the groove.

14. The valve of claim 13, wherein the valve operator is configured to raise pressure in the secondary washer passageway by bleeding a portion of the flow of washer fluid flowing from the tank passageway to the primary washer passageway to the secondary washer passageway through the bleed passageway in the fluid-flow regulator in response to a first electrical input.

15. The valve of claim 14, wherein the valve operator is configured to raise pressure in the primary washer passageway by bleeding a portion of the flow of washer fluid flowing from the tank passageway to the secondary washer passageway to the primary washer passageway through the bleed passageway in the fluid-flow regulator in response to a second electrical input.

\*    \*    \*    \*    \*